United States Patent
Matsumoto et al.

(10) Patent No.: US 8,533,898 B2
(45) Date of Patent: Sep. 17, 2013

(54) VEHICLE WIPER DEVICE AND VEHICLE

(75) Inventors: Hiroshi Matsumoto, Hamamatsu (JP);
Masahiko Yamanishi, Toyohashi (JP);
Masami Muramatsu, Shizuoka-ken
(JP); Yuta Doi, Toyohashi (JP)

(73) Assignee: ASMO Co., Ltd. (JP)

( * ) Notice: Subject to any disclaimer, the term of this patent is extended or adjusted under 35 U.S.C. 154(b) by 807 days.

(21) Appl. No.: 12/640,379

(22) Filed: Dec. 17, 2009

(65) Prior Publication Data

US 2010/0170054 A1 Jul. 8, 2010

(30) Foreign Application Priority Data

| Dec. 18, 2008 | (JP) | 2008-322292 |
| Aug. 18, 2009 | (JP) | 2009-189117 |
| Aug. 25, 2009 | (JP) | 2009-194715 |
| Aug. 25, 2009 | (JP) | 2009-194717 |

(51) Int. Cl.
*B60S 1/04* (2006.01)
*B60S 1/06* (2006.01)
*B60S 1/36* (2006.01)

(52) U.S. Cl.
USPC ............. 15/250.23; 15/250.21; 15/250.3; 15/250.27

(58) Field of Classification Search
USPC ............. 15/250.21, 250.23, 250.13, 250.3, 15/250.14, 250.27
IPC ................................................ B60S 1/24, 1/06
See application file for complete search history.

(56) References Cited

U.S. PATENT DOCUMENTS

| 5,005,249 A | * | 4/1991 | Nishizawa et al. | 15/250.27 |
| 5,548,863 A | * | 8/1996 | Deng | 15/250.16 |
| 6,564,419 B2 | | 5/2003 | Matsumoto et al. | |
| 6,708,365 B1 | * | 3/2004 | Zimmer | 15/250.21 |
| 6,732,400 B1 | | 5/2004 | Zimmer | |
| 8,046,866 B2 | * | 11/2011 | Hasegawa | 15/250.21 |
| 2002/0170135 A1 | * | 11/2002 | Zimmer | 15/250.21 |
| 2009/0094773 A1 | * | 4/2009 | Hasegawa | 15/250.27 |

FOREIGN PATENT DOCUMENTS

| DE | 10242409 A1 * | 3/2004 |
| DE | 102008031261 A1 * | 1/2009 |
| JP | 2-80054 U | 6/1990 |
| JP | 08-175337 | 7/1996 |
| JP | 2003-512236 A | 4/2001 |
| JP | 3693925 B2 | 8/2002 |
| JP | 2003034237 A * | 2/2003 |
| JP | 2005-014645 | 1/2005 |
| JP | 2010163156 A * | 7/2010 |
| WO | WO 2004026645 A1 * | 4/2004 |

* cited by examiner

*Primary Examiner* — Phi A

(74) *Attorney, Agent, or Firm* — Caesar, Rivise, Bernstein, Cohen & Pokotilow, Ltd.

(57) ABSTRACT

A vehicle wiper device including a wiper arm, a wiper blade, and a wiping range enlarging mechanism is disclosed. The wiper arm is driven by driving force of a drive source. The wiper blade is coupled to a distal portion of the wiper arm at a constant position relative to the wiper arm. The wiper blade moves back and forth between first and second reversing positions while wiping a wiping surface of a vehicle body when the wiper arm is driven. The wiping range enlarging mechanism drives the wiper arm while moving a basal portion of the wiper arm so that a wiping angle of a basal portion of the wiper arm becomes greater than a wiping angle of a distal portion of the wiper arm at the second reversing position.

18 Claims, 22 Drawing Sheets

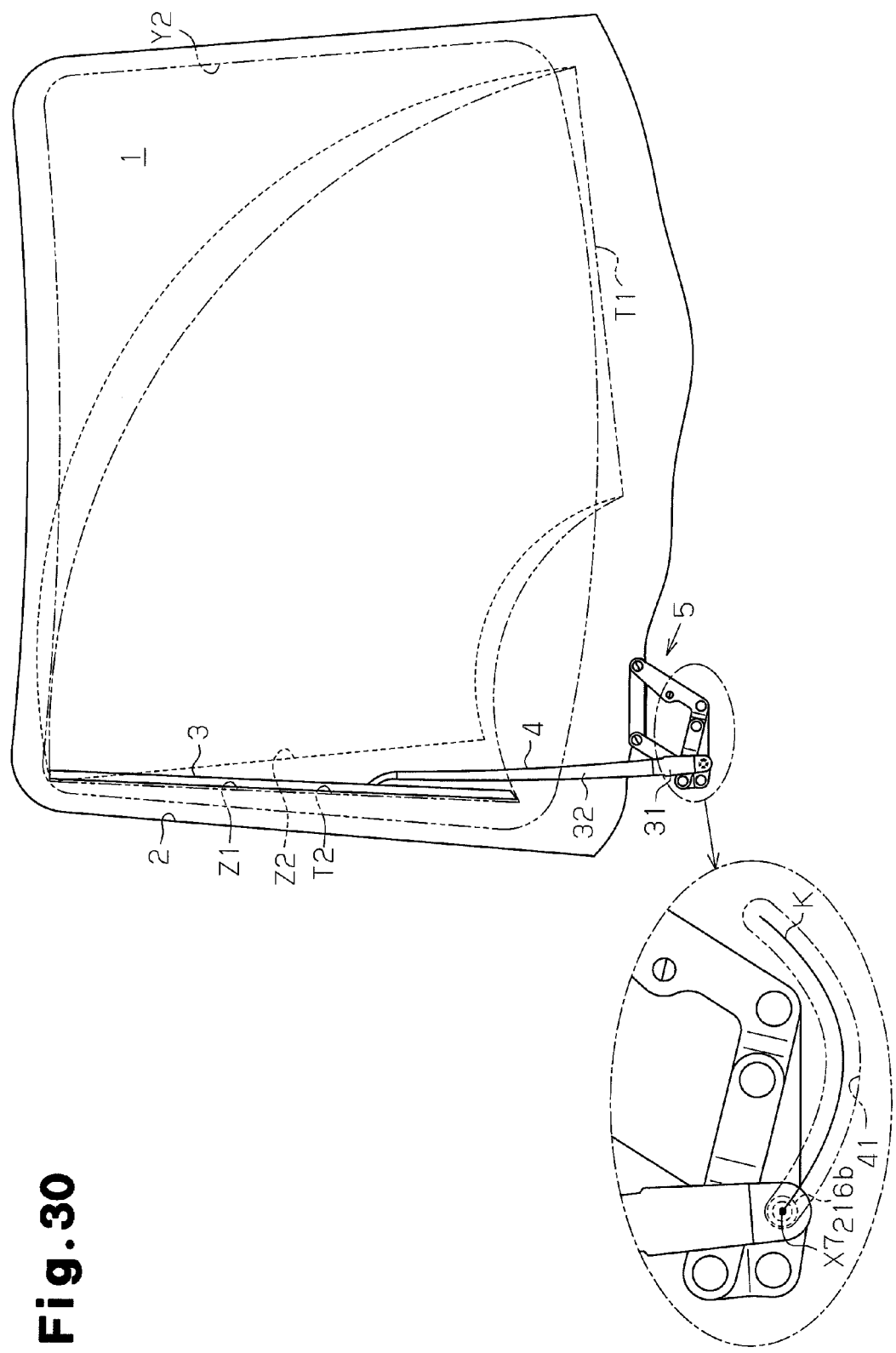

VEHICLE WIPER DEVICE AND VEHICLE

BACKGROUND OF THE INVENTION

The present invention relates to a vehicle wiper device for wiping a windshield or the like and a vehicle equipped with such a vehicle wiper device.

As a vehicle wiper device used in a vehicle such as an automobile, a known wiper device pivots a wiper arm and a wiper blade about a pivot axis. The wiper blade is coupled to the wiper arm so as to maintain a constant position relative to the wiper arm. In addition to such a wiper device, Japanese Laid-Open Utility Model Publication No. 2-80054 discloses a so-called semi-pantograph type or pantograph type wiper device that changes the position of the wiper blade relative to the wiper arm when performing a wiping operation.

The semi-pantograph type or pantograph type vehicle wiper device includes a sub-arm in addition to the wiper arm. The sub-arm is supported by the vehicle body so as to be pivotal about an axis that differs from that of the wiper arm. Further, the sub-arm extends along the wiper arm. The wiper blade and the sub-arm each have a distal portion. A wiper plate is arranged coupled by a coupling member to the distal portions of the wiper arm and the sub-arm so that the wiper arm is pivotal to each distal portion of the wiper arm and sub-arm. Thus, pivoting of the wiper arm cooperatively pivots the sub-arm and accordingly changes the position (angle) of the wiper blade relative to the wiper arm. This allows for a wiping range (substantially enlarged range), which differs from a simple semicircular shape. In a wiper device that pivots the wiper arm and the wiper blade about the same pivot axis, at a reversing position located near the pillar of the vehicle, a distal portion of the wiper blade becomes closer to the pillar than its basal portion. In other words, the wiper blade moves to a position at which its basal portion is more distant from the pillar than its distal portion. This may produce an unwiped area in the windshield near the basal portion. In the wiper device that includes the sub-arm, however, the position of the wiper blade relative to the wiper arm is varied so that the wiping range reaches a position extending along the pillar (one of the reversing positions of the wiper blade). This allows for reduction in the unwiped area.

However, in the wiper device that includes the sub-arm, the sub-arm is arranged along the wiper arm and extended to the wiper blade. This affects the aesthetic appearance of the vehicle. Further, in addition to the wiper arm, the sub-arm when driven also traverses the driver's front field of view. This adds to interference with the field of view.

SUMMARY OF THE INVENTION

It is an object of the present invention to provide a vehicle wiper device and a vehicle equipped with the vehicle wiper device that ensure a satisfactory wiping range without adversely affecting the aesthetic appearance or field of view.

To achieve the above object, one aspect of the present invention is a vehicle wiper device including a wiper arm, a wiper blade, and a wiping range enlarging mechanism. The wiper arm is driven by a driving force of a drive source.

The wiper blade is coupled to a distal portion of the wiper arm at a constant position relative to the wiper arm. The wiper blade moves back and forth between first and second reversing positions while wiping a wiping surface of a vehicle body when the wiper arm is driven. The wiping range enlarging mechanism drives the wiper arm while moving a basal portion of the wiper arm so that a wiping angle of the basal portion of the wiper blade at the second reversing position becomes greater than a wiping angle of a distal portion of the wiper blade.

A further aspect of the present invention is a wiper device including a wiper arm, a wiper blade, and a wiping range enlarging mechanism. The wiper arm is pivoted back and forth about a pivot center by a drive source. The wiper blade is coupled to a distal portion of the wiper arm at a constant position relative to the wiper arm. The wiper blade pivots back and forth between first and second reversing positions while wiping a wiping surface of a vehicle body as the wiper arm pivots back and forth. The wiping range enlarging mechanism drives the wiper arm while moving a pivot center of the wiper arm so that angular acceleration of the basal portion of the wiper blade is greater than angular acceleration of the distal portion of the wiper blade.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 30 is a schematic view showing a vehicle to which the wiper device according to the third embodiment has been mounted.

DETAILED DESCRIPTION OF THE PREFERRED EMBODIMENTS

Figure 1:
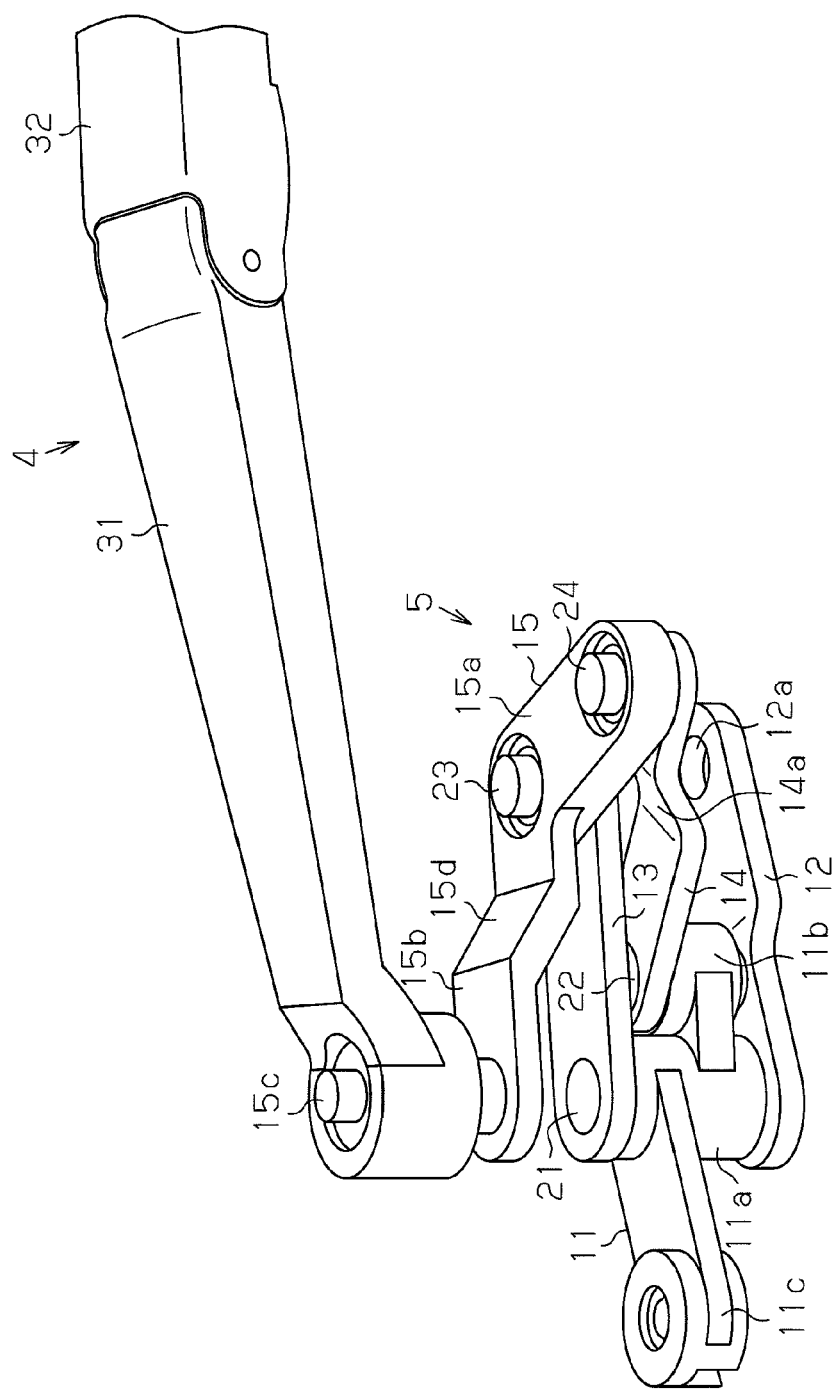
FIG. 1 is a perspective view showing a vehicle wiper device according to a first embodiment of the present invention.

A first embodiment of the present invention will now be discussed with reference to FIGS. 1 to 8. As shown in FIG. 6, a vehicle wiper device is arranged in the vicinity of the lower end of a windshield 1, which serves as a wiping surface of a vehicle body, near a pillar 2 of the vehicle. As shown in FIGS. 1 and 6, the vehicle wiper device includes a wiper blade 3 (see FIG. 6) for wiping the windshield 1, a wiper arm 4 including a distal portion to which the wiper blade 3 is coupled at a constant position, and a wiping range enlarging mechanism 5. The constant position refers to a state in which the angle of the wiper blade 3 relative to the wiper arm 4 when viewed from a direction orthogonal to the wiping surface (surface of the windshield 1) does not vary in cooperation with the wiping operation when the wiper device is driven. The wiper arm 4 is driven so that the wiper blade 3 moves back and forth between a first reversing position T1, which is a lower reversing position or a stop position located in the vicinity of the lower end of the windshield 1, and a second reversing position T2, which is an upper reversing position located in the vicinity of the pillar 2. The wiping angle at the second reversing position T2 is an angle obtained by using the angular position of the basal portion and the distal portion of the wiper arm 4 at the first reversing position T1 as a reference (0 degrees).

The wiping range enlarging mechanism 5 moves the wiper arm 4 back and forth while moving the basal portion of the wiper arm 4 so that the wiping angle (see wiping angle θ2 of FIG. 7) of the basal portion of the wiper blade 3 becomes greater than the wiping angle (see wiping angle θ1 of FIG. 7) of the distal portion at the second reversing position T2, or the upper reversing position located in the vicinity of the pillar 2, even though a wiping range Z1 (see FIG. 6) of the wiper blade 3 is substantially semicircular. FIG. 6 shows a wiping range Z2 as a subject for comparison that would be obtained when the wiper arm and the wiper blade are simply pivoted (wiping angle being the same at the basal portion and the distal portion of the wiper blade) using one point (position at which the wiping range enlarging mechanism 5 is located) of the vehicle body as an axis (pivot axis, see point O in FIG. 7).

Specifically, as shown in FIG. 1, the wiping range enlarging mechanism 5 of the first embodiment includes a vehicle fastening member 11, a rod coupling lever 12, a main lever 13, a sub-lever 14, and a coupling member 15.

The vehicle fastening member 11 includes a cylindrical first support 11a, a cylindrical second support 11b coupled to the first support 11a next to the first support 11a, and a vehicle fastening portion 11c that extends from the periphery of the first support 11a opposite to the second support 11b toward a position at which is does not interfere with the operation of each element. The axial length of the second support 11b shorter than the axial length of the first support 11a, and the second support 11b is coupled to the first support 11a in a stepped manner so that the top end of the second support 11b is lower than the top end of the first support 11a. The vehicle fastening portion 11c of the vehicle fastening member 11 is fastened and fixed to the vehicle body (attachment bracket of the vehicle body) by a bolt (not shown) or the like. Although the vehicle fastening member 11 includes only one vehicle fastening portion 11c, more vehicle fastening portions 11c may be used for stable fastening. Further, a projecting rod-shaped coupling portion may be formed and a frame of the module-type wiper device may be coupled and fixed to the coupling portion.

The rod coupling lever 12 is plate-shaped and formed to be linear when viewed in the thicknesswise direction (axial direction of a first shaft 21). The rod coupling lever 12 has a basal portion fixed to the lower end of the first shaft 21 and pivotally supported by the first support 11a so as to pivot integrally with the first shaft 21. A link rod, which is driven by the driving force of a drive source (e.g., wiper motor), which is not shown in the drawings, is coupled to a distal coupling portion 12a of the rod coupling lever 12 by a ball joint or the like. The driving force of the drive source pivots the rod coupling lever 12 back and forth.

The main lever 13 is plate-shaped and formed to be linear when viewed in the thicknesswise direction. The main lever 13 has a basal portion fixed to the upper end of the first shaft 21 and pivotally supported by the first support 11a so as to pivot integrally with the first shaft 21 and the rod coupling lever 12.

The sub-lever 14 is plate-shaped and formed to be linear when viewed in the thicknesswise direction (axial direction of a second shaft 22). Further, the sub-lever 14 includes a step 14a (see FIG. 1) formed in a direction orthogonal to the thicknesswise direction (direction orthogonal to the axis of the second shaft 22). The sub-lever 14 has a basal portion fixed to the upper end of the second shaft 22 and pivotally supported by the second support 11b so as to pivot integrally with the second shaft 22. The sub-lever 14 has a distal portion formed to have the same height as the distal portion of the main lever 13 (see FIG. 1) when viewed from a direction orthogonal to the thicknesswise direction (direction orthogonal to the axis of the second shaft 22) due to the step 14a.

The coupling member 15 includes a coupling linear portion 15a, which is plate-shaped and formed to be linear when viewed in the thicknesswise direction (axial direction of a first coupling portion 23), and an extended portion 15b, which is bent relative to an extending direction of the coupling linear portion 15a from the basal portion of the coupling linear portion 15a when viewed in the thicknesswise direction. The coupling linear portion 15a has a basal portion pivotally coupled to the first coupling portion 23, which is located at a distal portion of the main lever 13, and a distal portion pivotally coupled to a second coupling portion 24, which is located at the distal portion of the sub-lever 14. Accordingly, the coupling linear portion 15a is arranged to connect the distal portion of the main lever 13 and the distal portion of the sub-lever 14. A step 15d is formed so that the distal portion of the extended portion 15b is spaced apart from the main lever 13 in the thicknesswise direction to minimize contact of the extended portion 15b with the main lever 13. An arm support shaft 15c projects from a distal portion of the extended portion 15b, and a basal portion of the wiper arm 4 is fixed to a distal portion of the arm support shaft 15c so as to move integrally with the coupling member 15. In the wiping range enlarging mechanism 5 of the first embodiment, with respect to a direction extending along the surface of the windshield 1, the first support 11a (first shaft 21) is arranged to be constantly located (even when the main lever 13 is pivoted by the driving force of the drive source) at a position separated from the lower end of the windshield 1 (the side opposite to the windshield 1, or the lower (ground surface) side, more specifically, diagonally lower frontward side of the vehicle), that is at the lower (ground surface) side of the windshield 1 (opposite side of the windshield 1, that is, lower side (ground surface), relative to the first coupling portion 23 (distal portion of the main lever 13).

Figure 5:
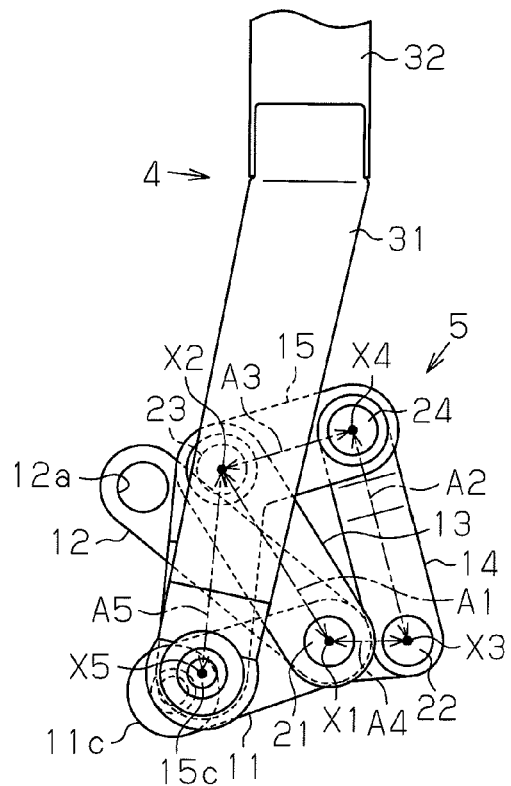
FIG. 5 is a plan view showing the wiper device according to the first embodiment.
Figure 6:
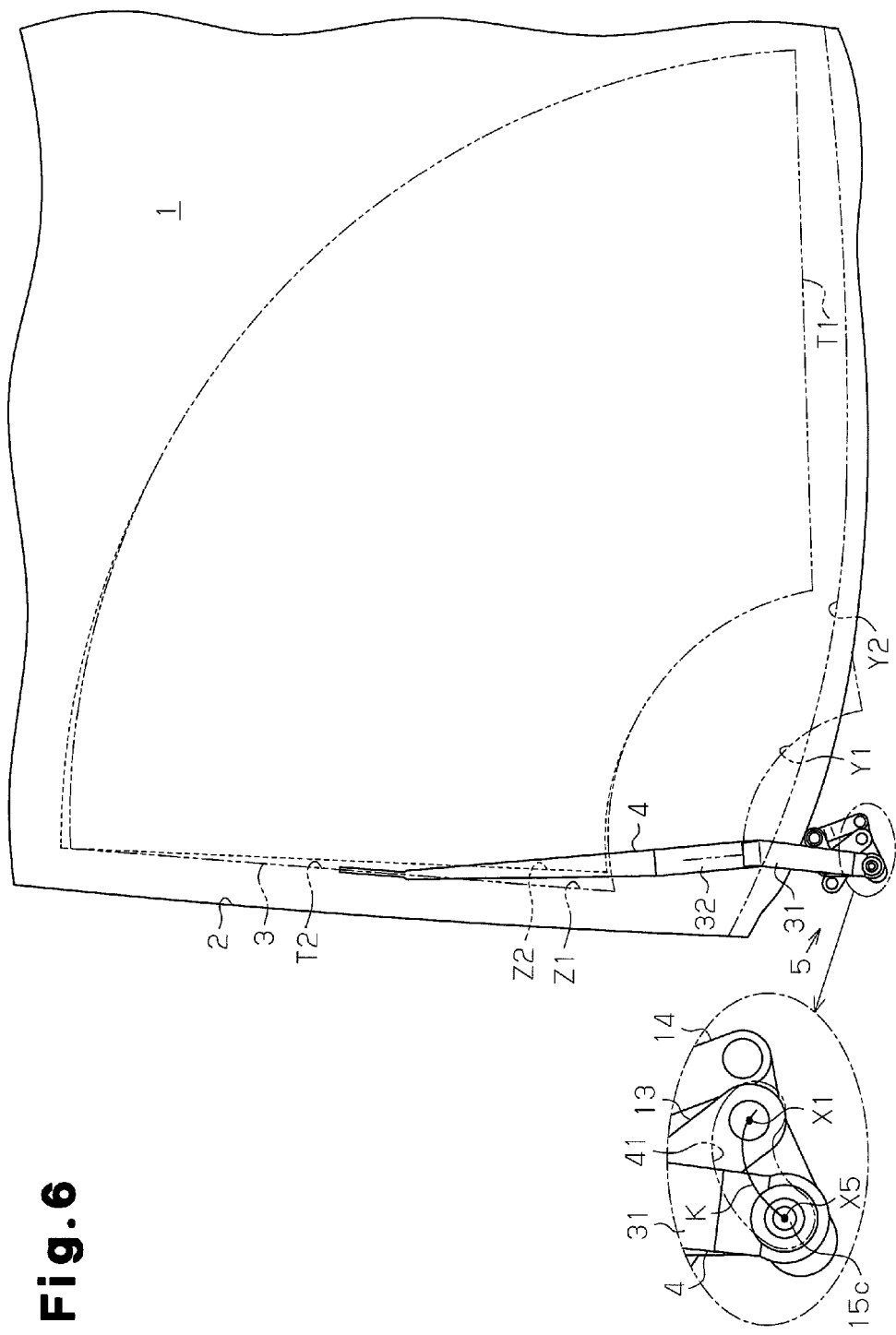
FIG. 6 is a schematic view showing a vehicle equipped with the wiper device according to the first embodiment.

As shown in FIG. 5, in the wiping range enlarging mechanism 5 of the first embodiment, distance A1 between a pivot center X1 of the main lever 13 relative to the first support 11a and a pivot center X2 of the coupling member 15 relative to the main lever 13 is set to be slightly smaller than distance A2 between a pivot center X3 of the sub-lever 14 relative to the second support 11b and a pivot center X4 of the coupling member 15 relative to the sub-lever 14. Distance A3 between the pivot center X2 and the pivot center X4 is set to be greater than distance A4 from the pivot center X1 to the pivot center X3 and less than the distance A1 from the pivot center X1 to the pivot center X2. Thus, the wiping range enlarging mechanism 5 has a structure similar to the so-called link mechanism, which includes two crank mechanisms, although the pivoting ranges of the main lever 13 and the sub-lever 14 are limited.

Further, the shaft center X5 of the arm support shaft 15c is set at a position at which distance A5 between the shaft center X5 and the pivot center X2 (first coupling portion 23) is equal to the distance A1 between the pivot center X2 (first coupling portion 23) and the pivot center X1 (first support 11a). Further, the shaft center X5 is set so as to become aligned with the pivot center X1 when the wiper arm 4 moves forth or moves back. In the first embodiment, the shaft center X5 of the arm support shaft 15c is set to be aligned with the pivot center X1 (see FIG. 2) at the first reversing position T1, which is the lower reversing position or the stop position in the vicinity of the lower end of the windshield 1. Further, in the first embodiment, when driven, the shaft center X5 of the arm support shaft 15c is also set to be aligned with the shaft center X1 at an intermediate point (point between the states shown in FIGS. 3 and 4) between the second reversing position T2 and the first reversing position T1.

The wiper arm 4 includes an arm head 31 and an arm body 32, which includes a retainer and an arm piece.

The arm head 31 has a basal portion fastened and fixed to the distal portion of the arm support shaft 15c of the coupling member 15 by a nut or the like (not shown).

The arm body 32 has a distal portion (arm piece) coupled to the wiper blade 3 (see FIG. 6), which is held at a constant position, and a basal portion (retainer), which is pivotally coupled to a distal portion of the arm head 31 so that the longitudinal direction of the wiper blade 3 extends in a direction substantially orthogonal to the wiping surface (surface of the windshield 1), that is, at an upright direction. A coil-shaped spring (not shown) is accommodated in the rear side (side facing the windshield 1) of the arm body 32. The spring is set in an expanded state between the arm head 31 and the arm body 32 (retainer). The spring biases with its elastic force the arm body 32 towards the windshield 1, that is, presses the wiper blade 3 against the surface of the windshield 1.

The wiping range enlarging mechanism 5 is arranged so as not to overlap the movement path range Y1 (see FIG. 6) of the arm body 32 when viewed from a direction orthogonal to the wiping surface (surface of the windshield 1), that is, so as not to project out of the movement path of the arm head 31 towards the arm body 32.

The wiping range enlarging mechanism 5 is also arranged outside a field of view range Y2 (the driver's field of view from the driver's seat, with the range excluding a portion of the windshield 1 overlapped with the dashboard) in the wiping surface (surface of the windshield 1).

Specifically, the arm support shaft 15c extends through an opening 41 (see double-dashed line in the partially enlarged view of FIG. 6) formed in the vehicle body (cowl louver etc.), the wiping range enlarging mechanism 5 excluding the distal portion of the arm support shaft 15c is arranged inside the vehicle body, and the wiper arm 4 is fixed to and supported by the arm support shaft 15c outside the vehicle body (position exposed to the exterior). The opening 41 of the first embodiment is set to be as small as possible and substantially extends along a movement path K (see partially enlarged view of FIG. 6) of the arm support shaft 15c (shaft center X5 of the arm support shaft 15c).

Figure 2:
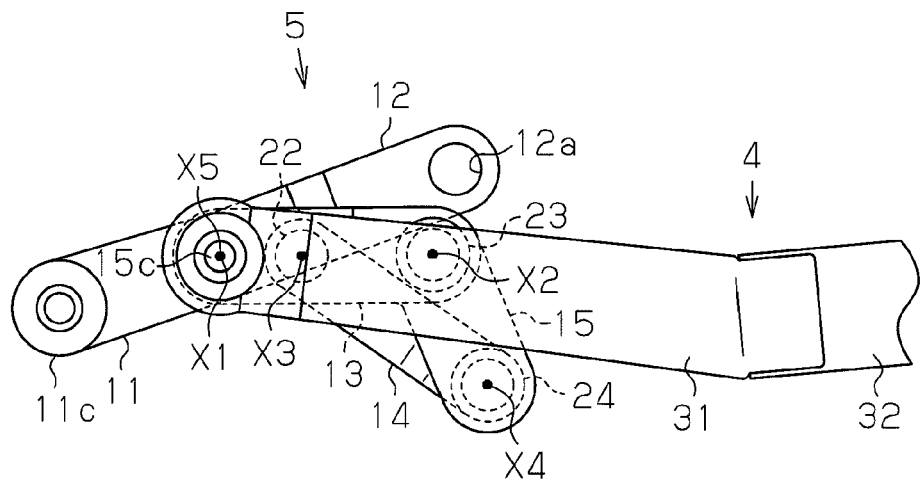
FIG. 2 is a plan view showing the wiper device according to the first embodiment.
Figure 3:
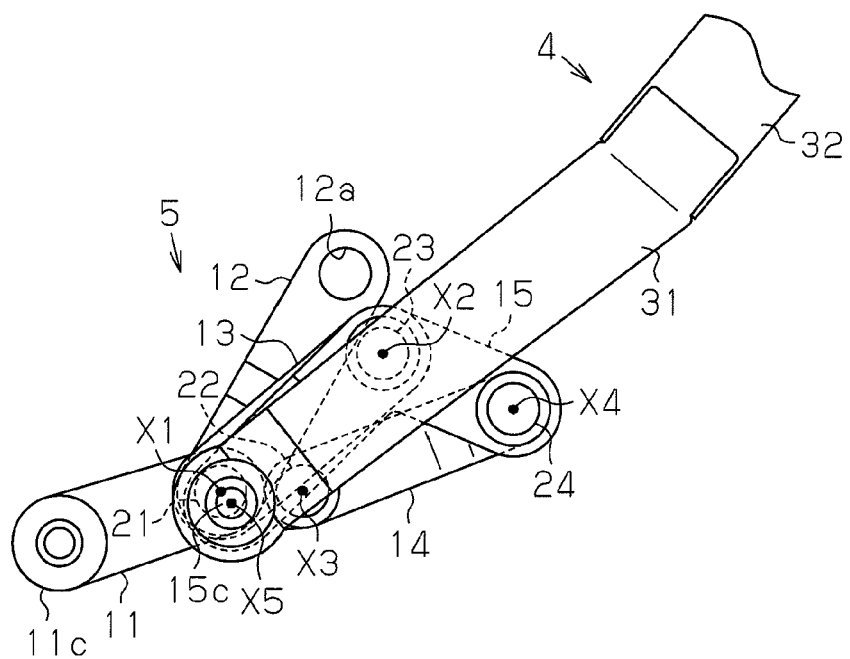
FIG. 3 is a plan view showing the wiper device according to the first embodiment.
Figure 4:
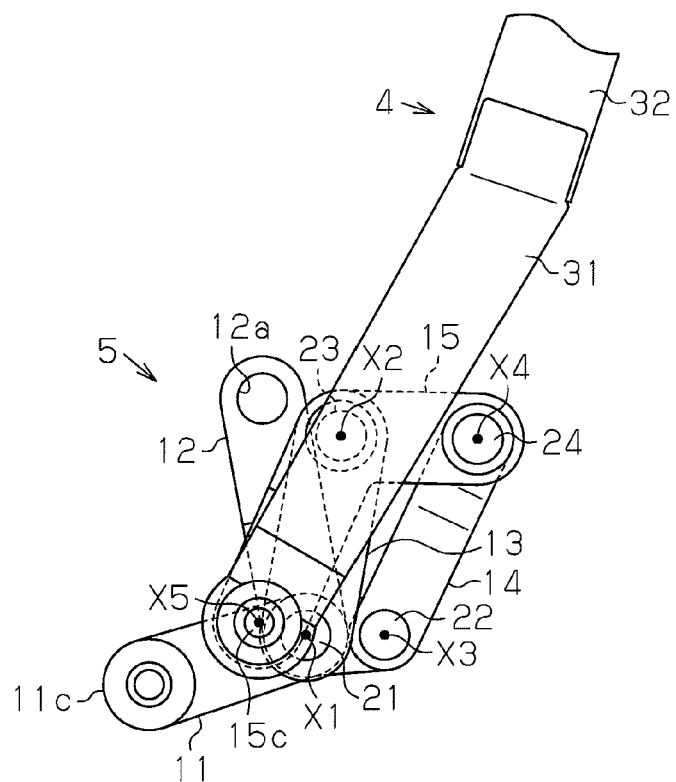
FIG. 4 is a plan view showing the wiper device according to the first embodiment.

As shown in FIGS. 2 to 5, in the vehicle wiper device described above, when the driving force of the drive source is transmitted to the rod coupling lever 12 by the link rod thereby integrally pivoting the main lever 13 with the rod coupling lever 12, the sub-lever 14 pivots accordingly. This varies the positions (angle) of the coupling member 15 and the wiper arm 4 with respect to the main lever 13. In this manner, when the position of the wiper arm 4 varies, the position (angle) of the wiper blade 3, which is coupled to the wiper arm 4 at a constant position, is also varied. FIG. 2 shows a state in which the wiper blade 3 is located at the first reversing position T1, FIGS. 3 and 4 sequentially show states of the wiper blade 3 as it moves towards the second reversing position T2 located at the side of the pillar 2, and FIG. 5 shows a state (see FIG. 6) in which the wiper blade 3 is located at the second reversing position T2. In other words, when the wiper blade 3 wipes the windshield 1 from the first reversing position T1 towards the second reversing position T2, the wiping range enlarging mechanism 5 drives the wiper arm 4 to move the basal portion of the wiper arm 4 towards the second reversing position T2. Thus, the wiping range enlarging mechanism 5 drives the wiper arm 4 to move the basal portion of the wiper arm 4 towards the outer side of the wiping surface Z2, more specifically, towards the outer side in the vehicle widthwise direction of the wiping surface Z2. When the wiper arm 4 is driven, the movement path K (see partially enlarged view of FIG. 6) is formed so that the shaft center X5 of the arm support shaft 15c slightly moves from the stop position (see FIG. 2), which is aligned with the pivot center X1, towards the pivot center X3 (see FIG. 3) and away from the lower end of the windshield 1. Then, the arm support shaft 15c is reversed to pass above the pivot center X1 and slightly move toward the opposite side of the pivot center X3 (side of the pillar 2) as it approaches the lower end of the windshield 1 (see FIG. 4). Subsequently, when the wiper blade 3 moves to the second reversing position T2, the shaft center X5 of the arm support shaft 15c moves away from the lower end of the windshield 1 and towards the opposite side (side of the pillar 2) of the pivot center X3. The usable ranges of the two crank mechanisms are set so that the pivot speed of the coupling member 15 (wiper arm 4) relative to the main lever 13, that is, the pivot speed in an opposite direction (clockwise direction as viewed in the drawing) of the pivoting direction of the main lever 13 (counterclockwise direction as viewed in the drawing) with respect to the first support 11a, becomes faster as the wiper blade 3 moves towards the second reversing position T2 from just before the second reversing position T2. In other words, the movement speed of the wiper arm 4 and the wiper blade 3 with respect to the windshield 1 obtained by combining the pivoting of the main lever 13 (counterclockwise direction as viewed in the drawing) relative to the first support 11a with the pivoting of the coupling member 15 (clockwise direction as viewed in the drawing) relative to the main lever 13 is set to become slower from before the second reversing position T2 as the second reversing position T2 becomes closer.

The first embodiment has the advantages described below.

(1) The wiper arm 4, to which the wiper blade 3 is coupled at a constant position, is driven by the wiping range enlarging mechanism 5 so that the wiping angle of the basal portion of the wiper blade 3 becomes greater than the wiping angle of the distal portion at the second reversing position T2 although the wiping range Z1 (see FIG. 6) of the wiper blade 3 is semicircular. In other words, when the wiper blade 3 pivots back and forth between the first and second reversing positions T1 and T2, the wiping range enlarging mechanism 5 drives the wiper arm 4 while moving the pivot center of the wiper arm 4 so that the angular acceleration of the basal portion of the wiper blade 3 becomes greater than the angular acceleration of the distal portion of the wiper blade 3. Thus, the wiping range Z1 (second reversing position T2 of the wiper blade 3) substantially extends along the pillar 2 and reduces the unwiped area without the need for a structure for changing the position of the wiper blade 3 relative to the wiper arm 4, that is, without the need for a sub-arm that is arranged along the wiper arm 4 and adversely affects the aesthetic appearance.

Figure 7:
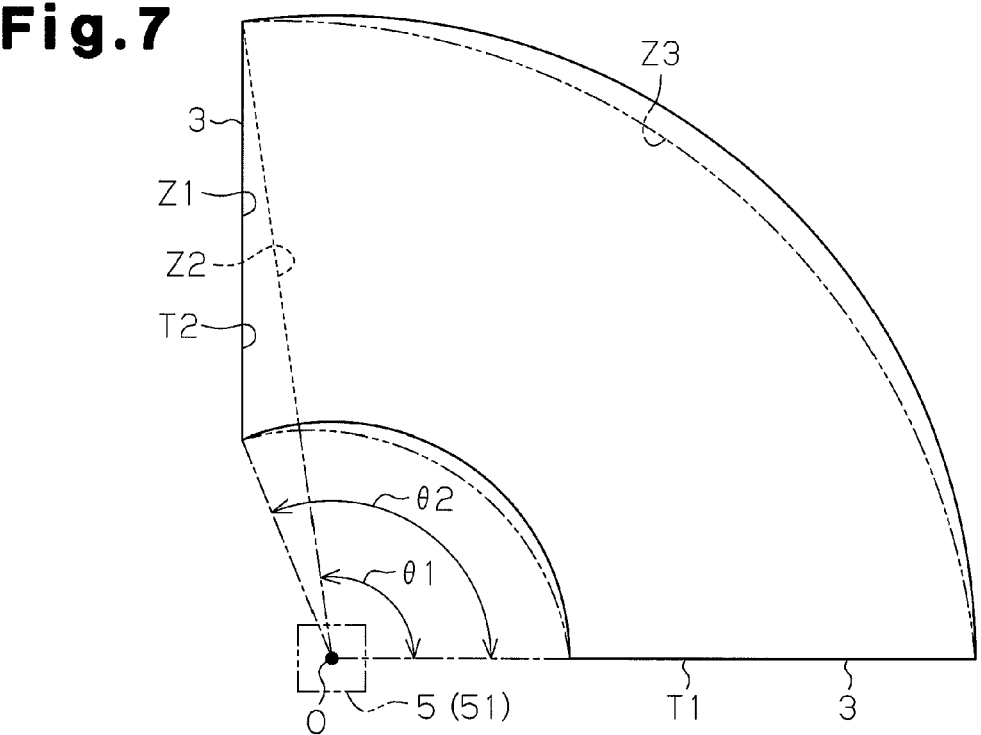
FIG. 7 is a schematic view showing a wiping range of the wiper device.

More specifically, when the wiper arm and the wiper blade are simply pivoted about the single point O of the vehicle body, for example, the pivot axis of the conventional wiper arm, as schematically shown in FIG. 7, in the wiping range Z2, the wiping angle is the same for the basal portion and the distal portion of the wiper blade. In contrast, in the wiping range Z1 obtained in the first embodiment (see FIG. 6), when the main lever 13 is pivoted about a single point O of the vehicle body, for example, the pivot center X1, in the wiping range Z2, the wiping angle θ2 for the basal portion of the wiper blade 3 is greater than the wiping angle θ1 for the distal portion.

Figure 8:
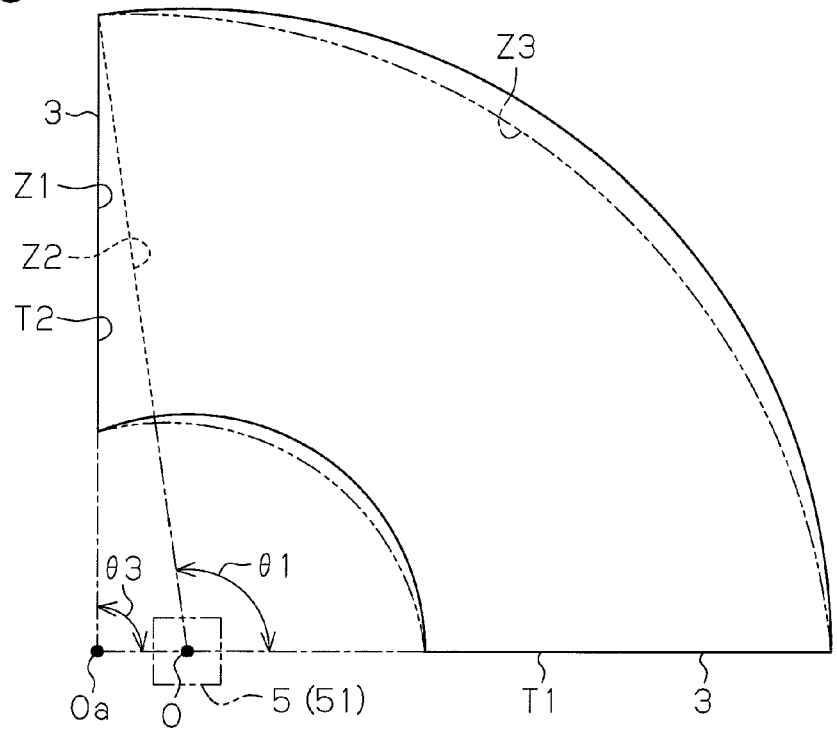
FIG. 8 is a schematic view showing the wiping range of the wiper device.

In other words, as schematically shown in FIG. 8, in comparison with the wiping range Z2 obtained when the wiper arm and the wiper blade are simply pivoted about the point O of the vehicle body, the wiping range enlarging mechanism 5 of the first embodiment obtains a greater wiping range Z1 without moving the point O outward and away from the vehicle body, that is, without arranging the point O at a hypothetical point Oa toward the left as viewed in FIG. 8. The wiping range Z1 is substantially the same as the wiping range obtained when the wiper arm and the wiper blade are simply pivoted about the virtual point Oa, which is spaced apart from the point O. That is, in the first embodiment, the wiping range Z1 is substantially the same as the wiping range obtained when the wiper arm and the wiper blade are simply pivoted about the virtual point Oa, with the pivot center X1 (point O) of the main lever 13 being arranged at an inner position closer to the wiping range Z1 than the virtual point Oa. In short, in the present embodiment, the pivot center X1 of the main lever 13 is arranged inward from the virtual point Oa while obtaining the wiping angle θ3 (see FIG. 8), which is the same as the wiping angle obtained when the wiper blade is simply pivoted about the virtual point Oa. Further, in the first embodiment, the wiping range enlarging mechanism 5 is arranged at a position closer to the wiping range Z2 than the virtual point Oa in a direction extending along at least one of the two reversing directions of the wiper blade 3 (direction extending along lower reversing position in this example) while obtaining the same wiping angle θ3 as the wiping angle obtained when the wiper blade is simply pivoted back and forth about the virtual point Oa. This increases the degree of freedom for the mounting position while obtaining a preferable wiping range, and arrangement of the vehicle wiper device (wiping range enlarging mechanism 5) may be facilitated by avoiding the widthwise ends of the vehicle where space is limited.

(2) In the wiping range enlarging mechanism 5, when the main lever 13 is pivoted by the driving force of the drive source, the sub-lever 14 is pivoted accordingly, and the positions (angles) of the coupling member 15 and the wiper arm 4 relative to the main lever 13 are varied. This easily obtains advantage (1) with the driving force of a single drive source by using the mechanical lever coupling.

(3) A state (so-called lock back state) in which the longitudinal direction of the wiper blade 3 is directed in a direction substantially orthogonal to the wiping surface (surface of the windshield 1) is obtained by pivoting the arm body 32 relative to the arm head 31. A lock back pivoting mechanism is also required for the sub-arm of the sub-arm used in the prior art. However, in the present structure, the lock back state is simple since the sub-arm is not required. In particular, the lock back pivoting mechanism does not need to be arranged in the wiping range enlarging mechanism 5 or the like.

(4) The wiping range enlarging mechanism 5 is arranged at a position that is not overlapped with the movement path range Y1 (see FIG. 6) of the arm body 32 when viewed from a direction orthogonal to the wiping surface (surface of the windshield 1), that is, so as not to project toward the arm body 32 from the movement path of the arm head 31. This prevents the wiping range enlarging mechanism 5 from interfering with the field of view.

(5) The shaft center X5 of the arm support shaft 15c for supporting the wiper arm 4 is set at a position where the distance A5 between the shaft center X5 and the pivot center X2 is equal to the distance A1 between the pivot center X2 and the pivot center X1. In addition, the shaft center X5 is set at a position where the shaft center X5 becomes aligned with the pivot center X1 at least once when the wiper arm 4 moves forth or moves back. This reduces the movement amount (movement path K) of the arm support shaft 15c compared to when the shaft center X5 is set at a different position. This allows for the opening 41, which is formed in the vehicle body (cowl louver etc.) to receive the arm support shaft 15c, to be smaller.

(6) Interference in the field of view by the wiping range enlarging mechanism 5 is prevented since the wiping range enlarging mechanism 5 is arranged outside the field of view range Y2 in the wiping surface (surface of the windshield 1). In the first embodiment, the arm support shaft 15c extends through the opening 41 formed in the vehicle body (cowl louver etc.), the wiping range enlarging mechanism 5 excluding the distal portion of the arm support shaft 15c is arranged inside the vehicle body, and the wiper arm 4 is fixed to and supported by the arm support shaft 15c outside the vehicle body (position exposed to the exterior). This prevents the wiping range enlarging mechanism 5 from adversely affecting the aesthetic appeal and prevents the driver's field of view from being interfered. Further, the size of the opening 41 is minimized in the movement path K of the arm support shaft 15*c*. This reduces foreign matter that enters the vehicle body and prevents the wiping range enlarging mechanism 5 from trapping foreign matter therein.

(7) The movement (pivoting) speed of the wiper arm 4 and the wiper blade 3 with respect to the windshield 1 toward the second reversing position T2 slows just before reaching the second reversing position T2. This reduces the impact and noise produced when reversing directions.

The first embodiment may be modified as described below.

Figure 9:
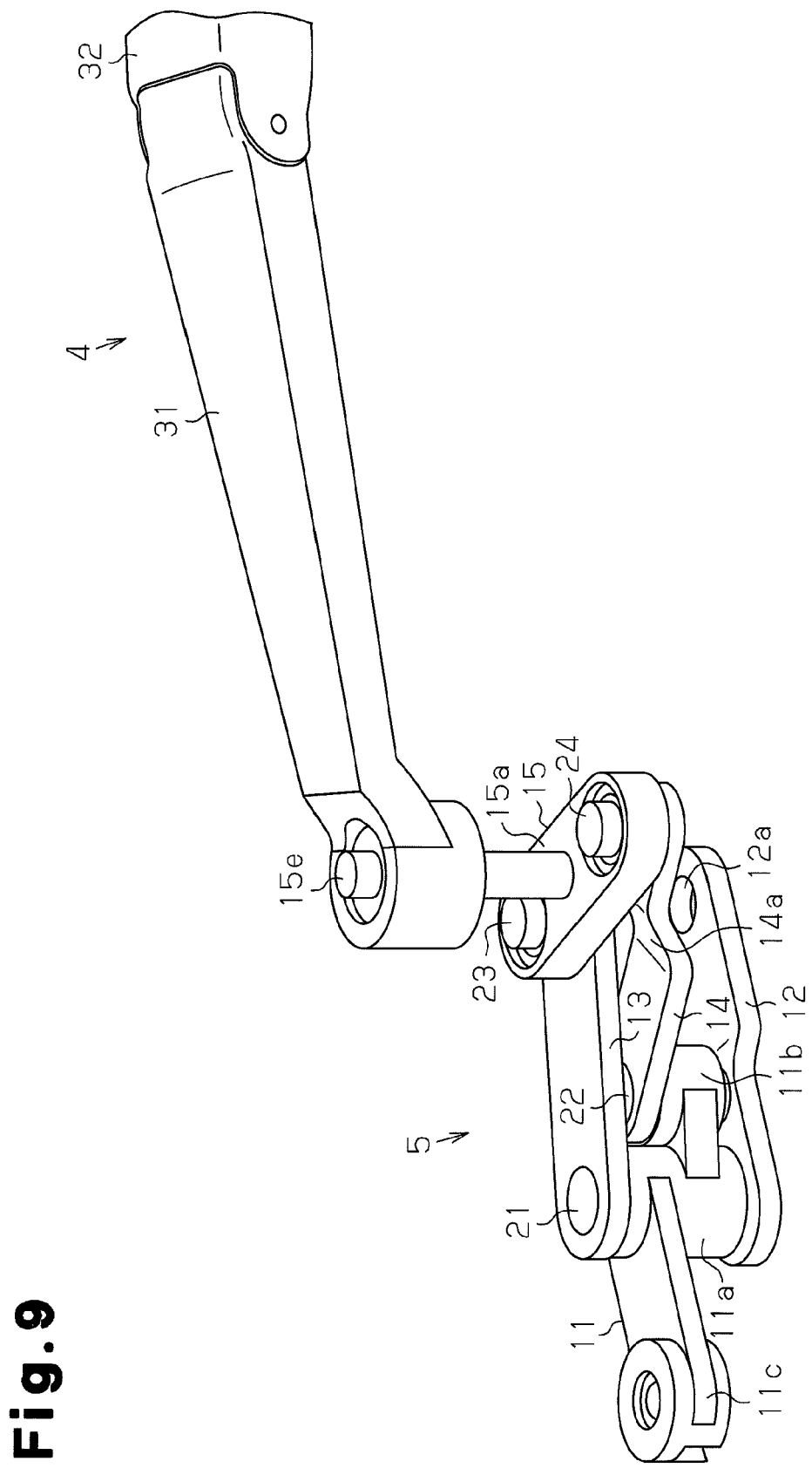
FIG. 9 is a perspective view showing a modification of the wiper device according to the first embodiment.

The shaft center X5 of the arm support shaft 15*c* of the first embodiment may be changed to a different position. For example, as shown in FIG. 9, the extended portion 15*b* may be eliminated from the coupling member 15 of the first embodiment, and a arm support shaft 15*e* may be formed at an intermediate portion of the coupling member 15 (coupling linear portion 15*a*). This simplifies the shape of the coupling member 15 and reduces material cost.

Figure 10:
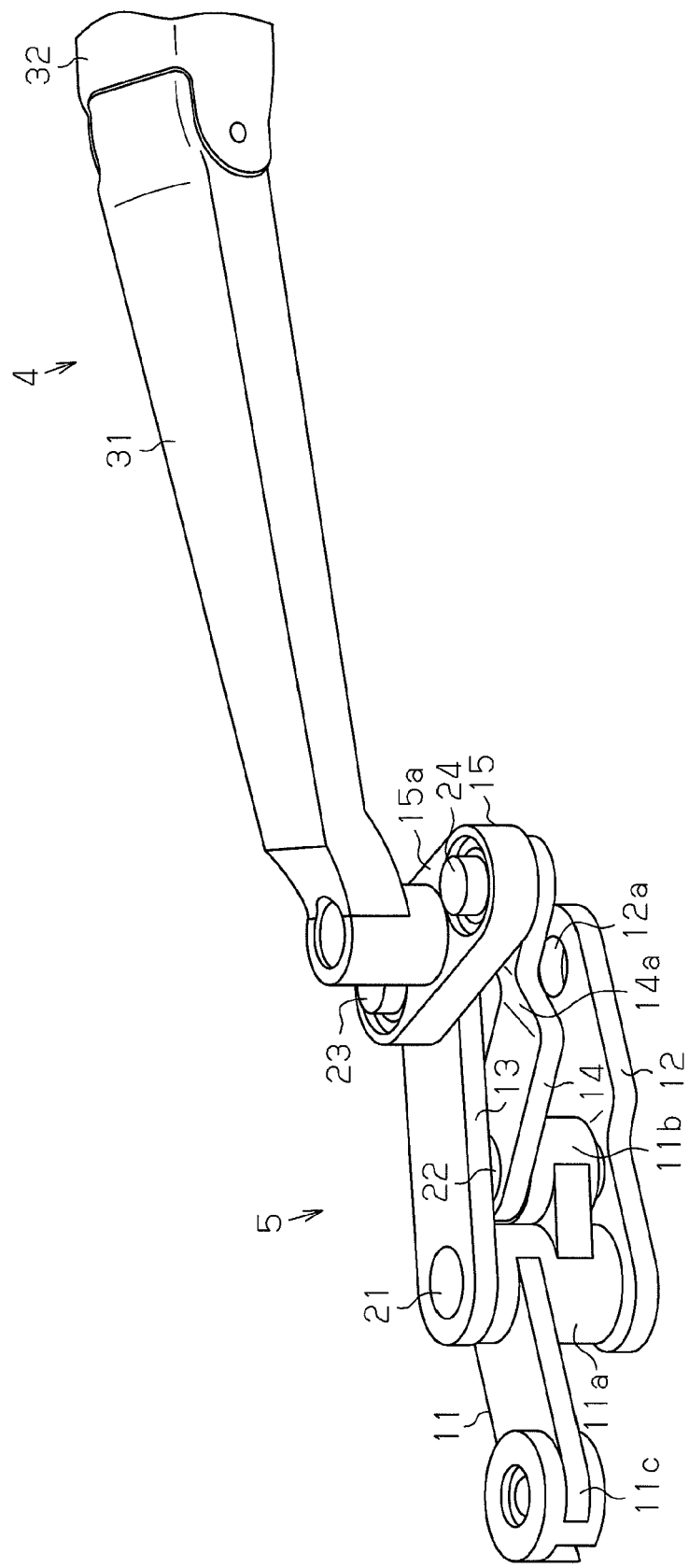
FIG. 10 is a perspective view of a modification of the wiper device according to the first embodiment.

Further, as shown in FIG. 10, the arm head 31 and the coupling member 15 may be formed integrally from aluminum alloy through die cast molding in the structure of FIG. 9. This reduces the number of components and the number of assembly steps compared with the structure of FIG. 9.

In the first embodiment, the first support 11*a* (first shaft 21) is constantly spaced apart downward from the lower end of the windshield 1 (specifically, position spaced diagonally downward from the front of the vehicle) with respect to the first coupling portion 23 (the distal portion of the first coupling portion 23). However, the present invention is not limited in such a manner and may be changed to other structures.

For instance, the wiping range enlarging mechanism 51 may be changed to the structure shown in FIGS. 7 and 11 to 16B. As schematically shown in FIG. 7, the wiping range enlarging mechanism 51 drives the wiper arm 4 so that the wiping angle (see wiping angle θ2 of FIG. 7) of the basal portion of the wiper blade 3 becomes greater than the wiping angle (see wiping angle θ1 of FIG. 7) of the distal portion at the second reversing position T2 although the wiping range Z3 of the wiper blade 3 is semicircular. The wiping range enlarging mechanism 51 of such a modification (see FIGS. 11 to 14) further increase movement of the basal portion (arm head 31) of the wiper arm 4 in comparison with the wiping range enlarging mechanism 5 of the first embodiment so that the wiping range Z3 greatly differs from the wiping range Z1 of the first embodiment, as schematically shown in a similar manner in FIG. 7. As schematically shown in FIG. 7, even though the wiping range Z3 of the wiping range enlarging mechanism 51 of this modification (see FIGS. 11 to 14) is semicircular, the radius is small at an arcuate intermediate portion of the wiping range Z3.

Figure 11:
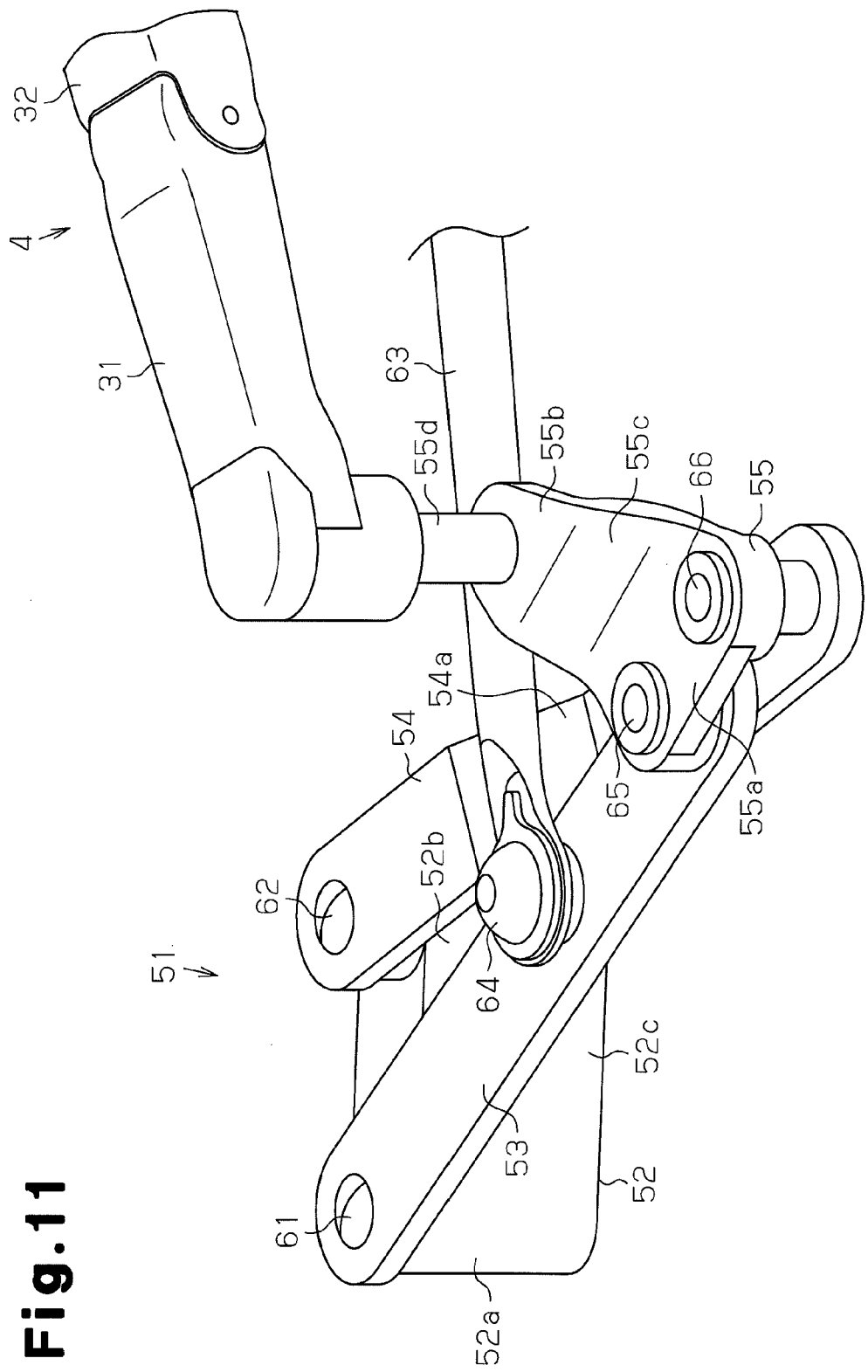
FIG. 11 is a perspective view showing a modification of the wiper device according to the first embodiment.

More specifically, the wiping range enlarging mechanism 51 of this modification (see FIGS. 11 and 12) includes a vehicle fastening member 52, a main lever 53, a sub-lever 54, and a coupling member 55. As shown in FIG. 11, the vehicle coupling member 52 includes a first support 52*a*, a second support 52*b* arranged at a position spaced apart from the first support 52*a*, and a coupling fastening portion 52*c* coupling the first support 52*a* and the second support 52*b* and fixed to the vehicle body. A first shaft 61 is inserted through the first support 52*a*, and a second shaft 62 is inserted through the second support 52*b*. The second shaft 62 is parallel to the first shaft 61.

The main lever 53 is plate-shaped and formed to be linear when viewed in the thicknesswise direction (axial direction of the first shaft 61). The main lever 53 has a basal portion fixed to the upper end of the first shaft 61 and pivotally supported by the first support 52*a* so that the main lever 53 is pivoted integrally with the first shaft 21. A link rod 63, which is driven by the driving force of the drive source (not shown), is coupled to the intermediate portion of the main lever 53 by a ball joint 64. The main lever 53 is pivoted back and forth about the first shaft 61 by the driving force of the drive source.

The sub-lever 54 is plate-shaped and formed to be linear when viewed in the thicknesswise direction (axial direction of the second shaft 62) and includes a step 54*a* (see FIG. 11) formed in a direction orthogonal to the thicknesswise direction (direction orthogonal to the axis of the second shaft 62). The sub-lever 54 has a basal portion fixed to the upper end of the second shaft 62, which is pivotally supported by the second support 52*b*, so that the sub-lever 54 is integrally pivotal with the second shaft 62. The sub-lever 54 has a distal portion that is arranged to be lower (position closer to the ground surface) than the distal portion of the main lever 53 due to the step 54*a* (see FIG. 11) when viewed from a direction orthogonal to the thicknesswise direction (direction orthogonal to the axis of the second shaft 62).

The coupling member 55 includes a coupling linear portion 55*a*, which is plate-shaped and formed to be linear when viewed in the thicknesswise direction (axial direction of first coupling portion 65), and an extended portion 55*b*, which extends in a direction substantially orthogonal to the extending direction of the coupling linear portion 55*a* from the coupling linear portion 55*a* when viewed in the thicknesswise direction. The coupling linear portion 55*a* has a basal portion pivotally coupled to the first coupling portion 65, which is located at the distal portion of the main lever 53, and a distal portion pivotally coupled to the second coupling portion 66, which is located at the distal portion of the sub-lever 54. Thus, the coupling member 55 couples the distal portion of the main lever 53 and the distal portion of the sub-lever 54. A step 55*c* is formed at a basal part of the extended portion 55*b* so that a distal part of the extended portion 55*b* is spaced apart from the main lever 53 and the sub-lever 54 in the thicknesswise direction. An arm support shaft 55*d* projects from the distal part of the extended portion 55*b*, and the basal portion of the wiper arm 4 (specifically, the arm head 31) is fixed to the distal portion of the arm support shaft 55*d* to move integrally with the coupling member 55. In the wiping range enlarging mechanism 51 of this modification, the first coupling portion 65 (distal portion of the main lever 53) is set to be constantly arranged (even when the main lever 53 is pivoted by the driving force of the drive source) in the side spaced apart from the lower end of the windshield 1 (lower (ground surface) side, specifically, the diagonally lower frontward side of the vehicle) with respect to the first support 52*a* (first shaft 61).

Figure 12:
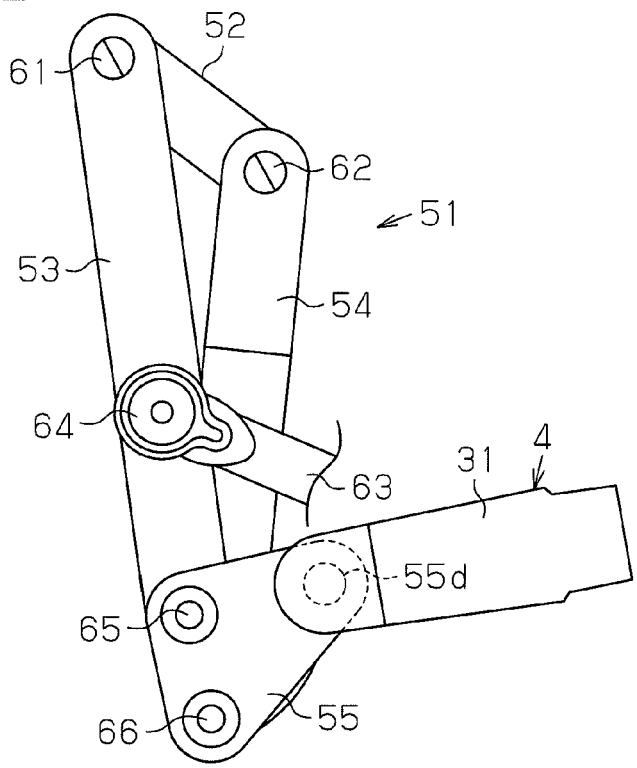
FIG. 12 is a plan view showing a modification of the wiper device according to the first embodiment.
Figure 13:
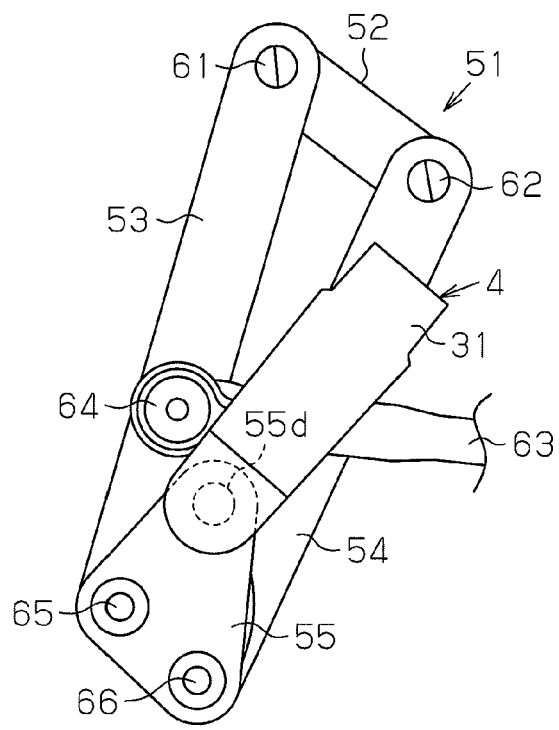
FIG. 13 is a plan view showing a modification of the wiper device according to the first embodiment.
Figure 14:
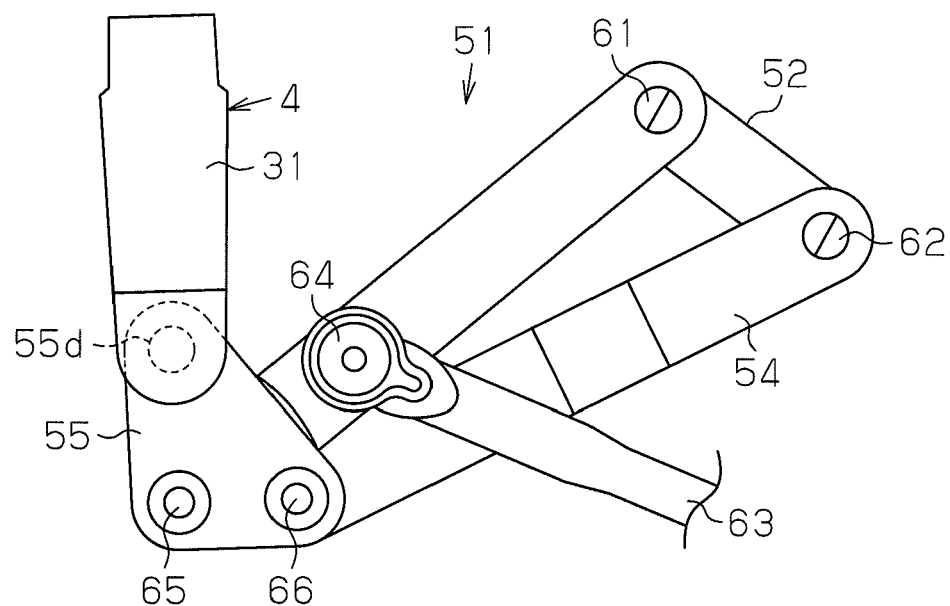
FIG. 14 is a plan view showing a modification of the wiper device according to the first embodiment.

As shown in FIGS. 12 to 14, in such a vehicle wiper device, when the driving force of the drive source is transmitted to the main lever 53 by the link rod 63 thereby pivoting the main lever 53, the sub-lever 54 also pivots and changes the position (angle) of the coupling member 55 and the wiper arm 4 with respect to the main lever 53. Thus, the position (angle) of the wiper blade 3 coupled to the wiper arm 4 at a constant position also changes as the position of the wiper arm 4 changes. FIG. 12 shows a state in which the wiper blade 3 is arranged at the first reversing position T1. FIG. 13 shows a state in which the wiper blade 3 is moving towards the second reversing position T2. FIG. 14 shows a state in which the wiper blade 3 is arranged at the second reversing position T2.

Such a structure obtains the same advantages as the first embodiment.

In addition, the first coupling portion 65 (distal portion of the main lever 53) is constantly arranged at a position spaced apart towards the diagonally lower frontward side of the vehicle from the lower end of the windshield 1 along the surface of the windshield 1 with respect to the first support 52*a* (first shaft 61). Thus, the first support 52*a* (vehicle fastening member 52), which is large to securely support the main lever 53, may be arranged distant in the opposite direction from the diagonally lower frontward side of the vehicle in which reduction in the mounting space has been particularly required over these recent years. The reduction of the mounting space at the diagonally lower frontward side of the windshield 1 of the vehicle is required to provide space for an engine room due to the recent trend in miniaturization of the vehicle. Specifically, when the first support 11*a* (first shaft 21) is constantly arranged at the diagonally lower frontward side of the vehicle with respect to the first coupling portion 23 (distal portion of the main lever 13) as in the first embodiment, a wiping range similar to that of the wiping range enlarging mechanism 51 of this modification would result in a wiping range enlarging mechanism 71 shown in FIGS. 15A and 16A. As shown in FIG. 16A, when using an arm support shaft 71*a* extending through an opening 82 formed in the vehicle body (cowl louver 81) as a reference, a first support 71*c* (vehicle fastening member), which is large to securely support a main lever 71*b*, is arranged on the diagonally lower frontward side of the vehicle in the wiping range enlarging mechanism 71. The first support 71*c* thus easily interferes with the vehicle body (cowl 83), as shown in FIG. 16A. In contrast, with the wiping range enlarging mechanism 51 of the modification described above (see FIGS. 11 to 14), the first support 52*a* (vehicle fastening member 52), which is large to securely support the main lever 53, is arranged on the diagonally upper rearward side of the vehicle using the arm support shaft 55*d* as a reference, as shown in FIG. 16B. Thus, the first support 52*a* (vehicle fastening member 52) is less likely to interfere with the vehicle body (cowl 83), and a large space may be ensured at the diagonally lower frontward side of the vehicle where reduction of the mounting space is particularly required over these recent years. In other words, the wiping range enlarging mechanism 51 of this modification (see FIGS. 11 to 14, 15B, and 16B) reduces the size of the lower side of the cowl 83 compared with the wiping range enlarging mechanism 71 (FIGS. 15A and 16A) and ensures, for example, a large engine room or the like.

Figure 15A:
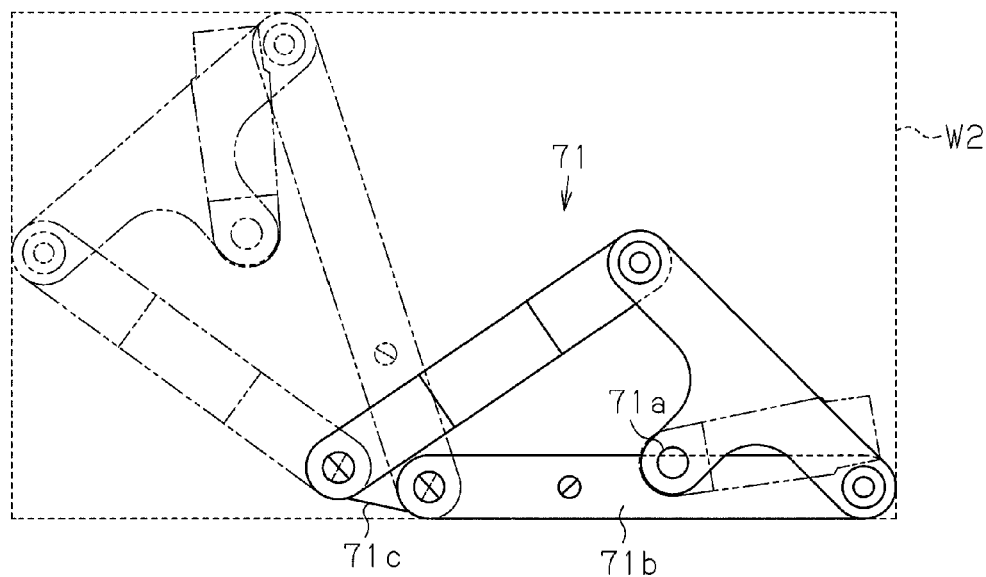
FIGS. 15A and 15B are schematic views showing a mounting space of the wiper device (wiping range enlarging mechanism) in a modification of the first embodiment.
Figure 15B:
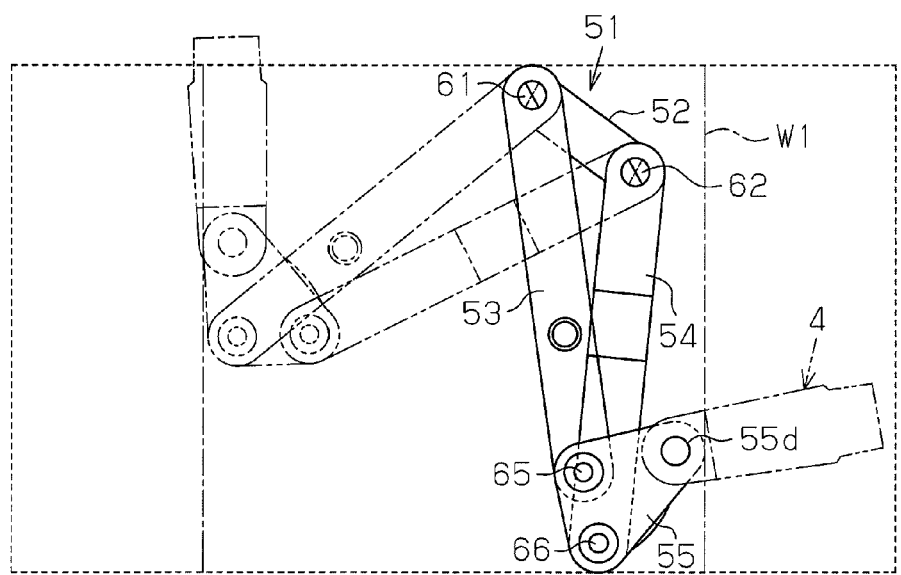
Figure 16A:
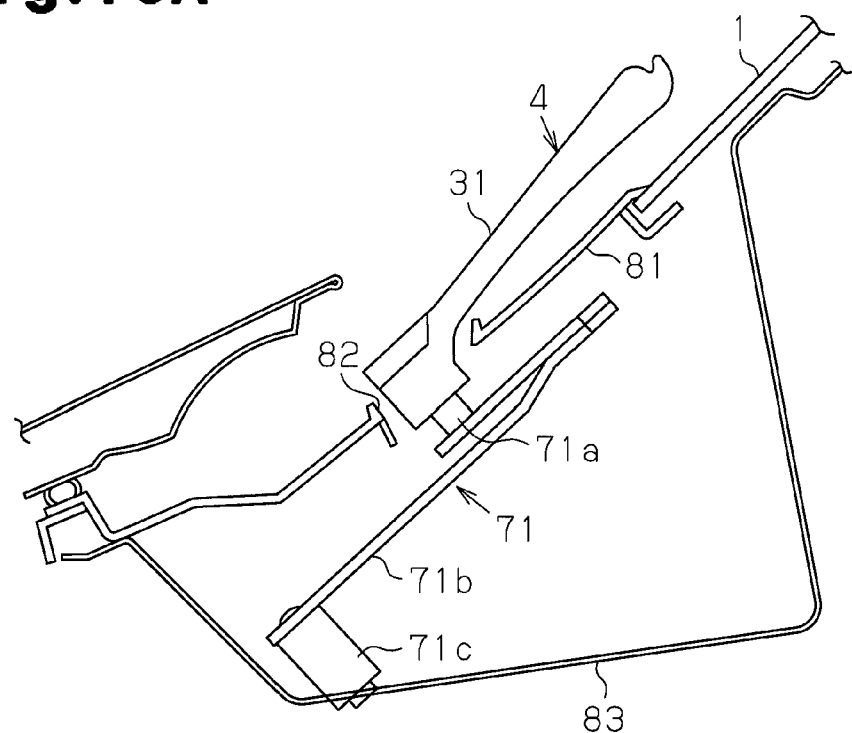
FIGS. 16A and 16B are schematic views for describing an arrangement of the wiper device (wiping range enlarging mechanism) in a modification of the first embodiment.
Figure 16B:
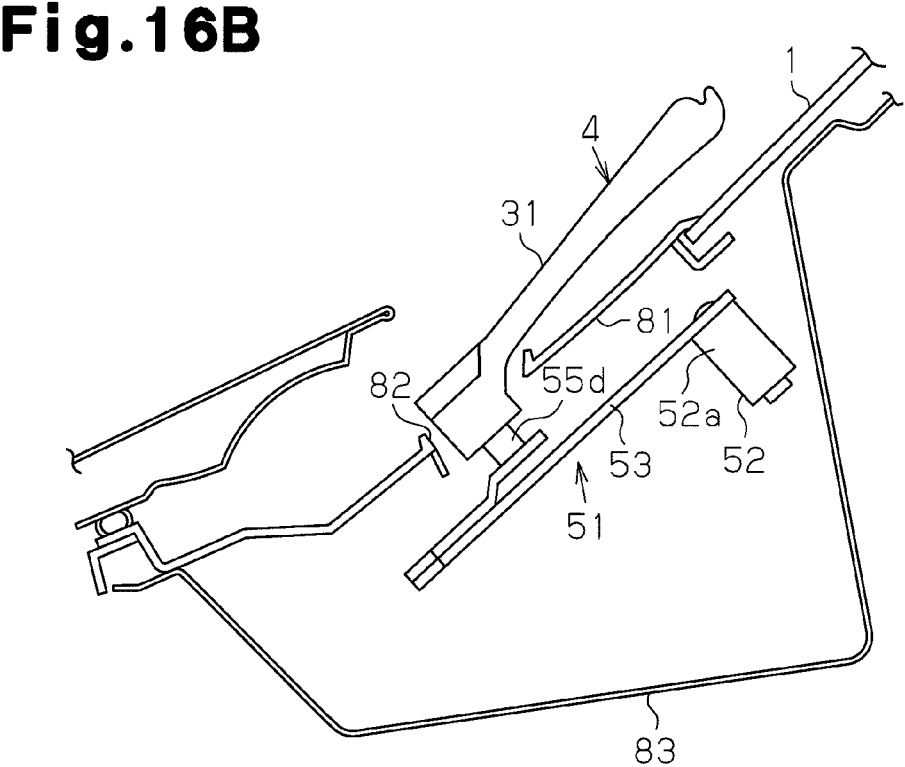

As shown in FIGS. 15A and 15B, the wiping range enlarging mechanism 51 of this modification (see FIGS. 11 to 14, 15B, and 16B) forms a mounting space W1, as viewed from each axial direction, allowing for the space required for movement to be smaller than a mounting space W2 of the wiping range enlarging mechanism 71 since the pivot angle of the main lever 53 is small. Thus, the mounting characteristics of the vehicle wiper device (wiping range enlarging mechanism 51) and the engine are improved.

In the first embodiment, the wiping range enlarging mechanism 5 is arranged at a position that does not overlap with the movement path range Y1 (see FIG. 6) of the arm body 32 when viewed from a direction orthogonal to the wiping surface (surface of the windshield 1). However, the present invention is not limited in such a manner and may be arranged at a position overlapping the movement path range Y1 (see FIG. 6).

A second embodiment according to the present invention will now be discussed with reference to FIGS. 17 to 25 centering on differences from the first embodiment.

Figure 17:
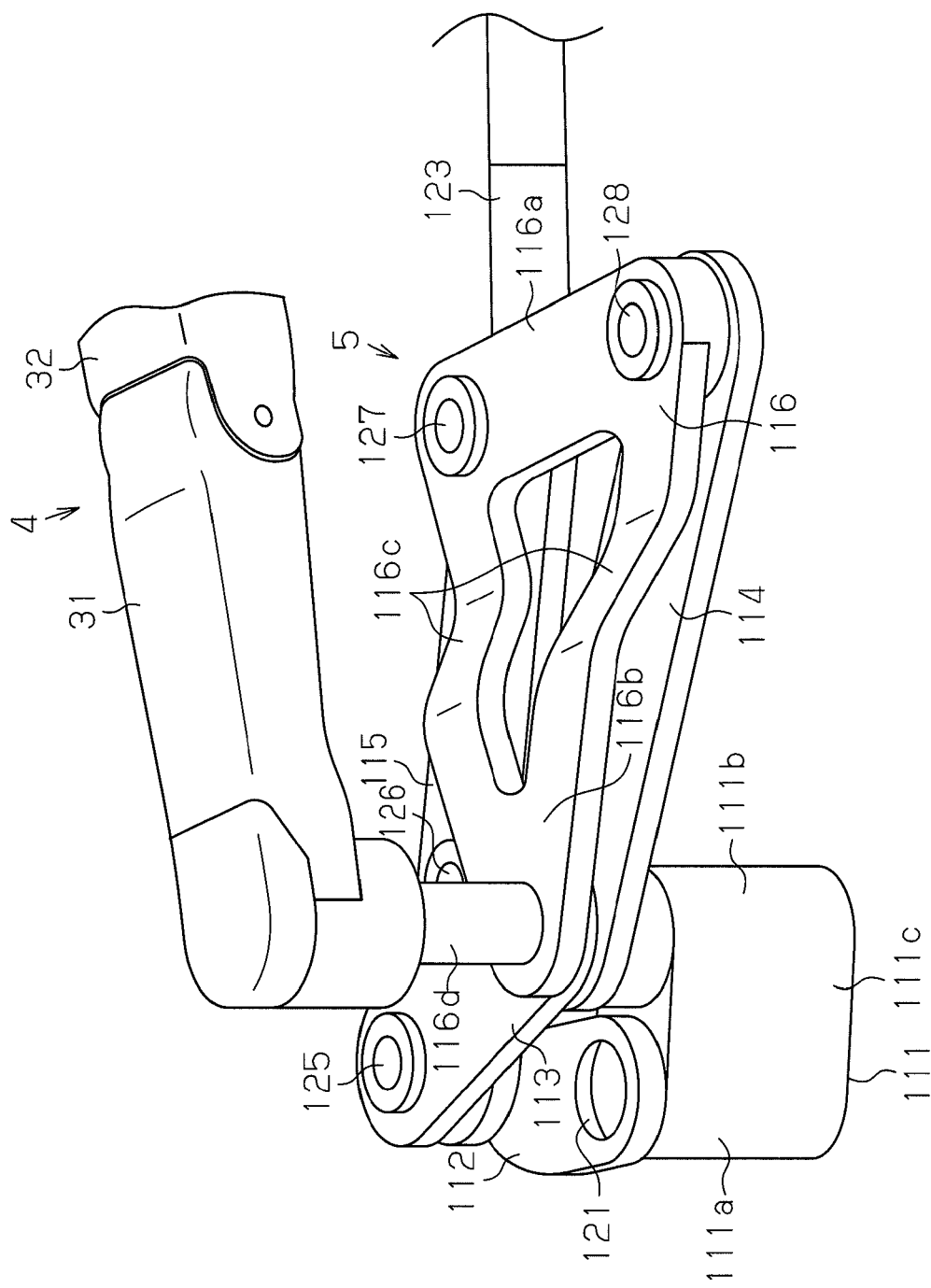
FIG. 17 is a perspective view showing a vehicle wiper device according to a second embodiment of the present invention.
Figure 18:
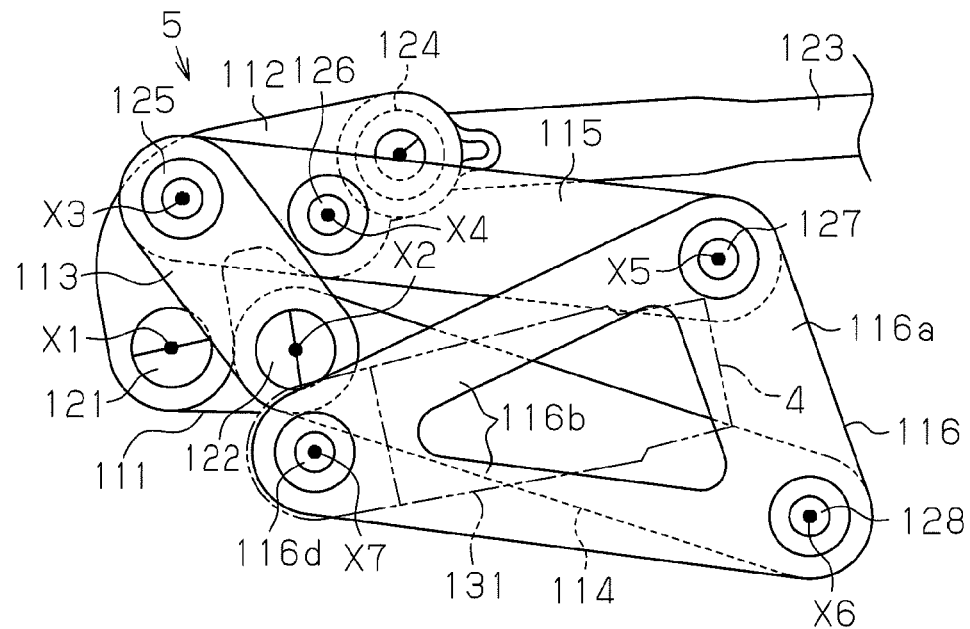
FIG. 18 is a plan view showing the wiper device according to the second embodiment.
Figure 19:
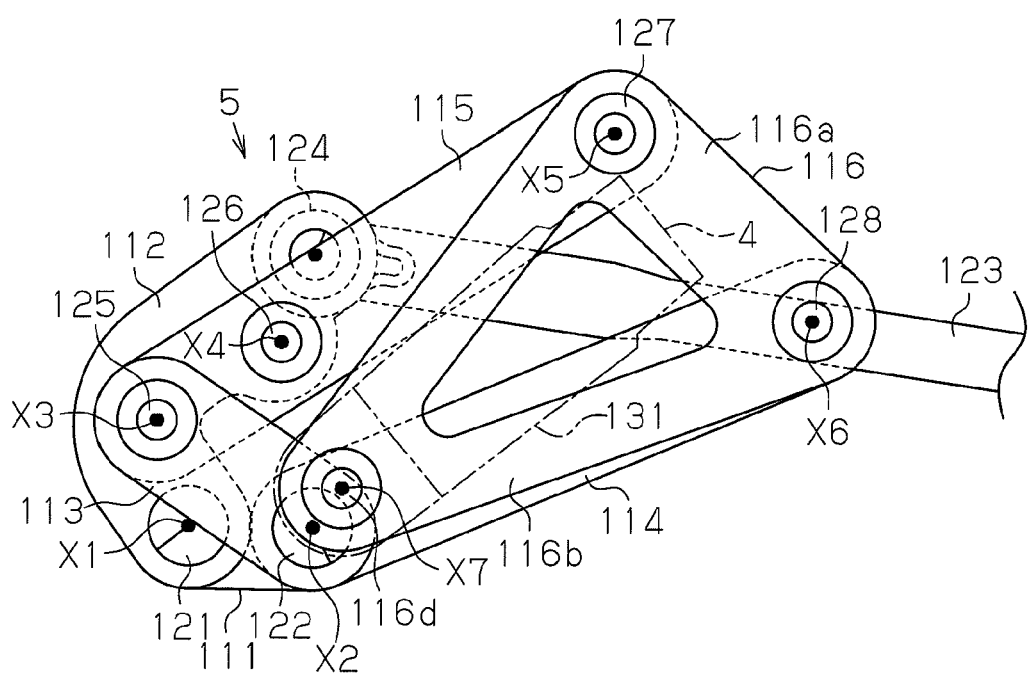
FIG. 19 is a plan view showing the wiper device according to the second embodiment.
Figure 20:
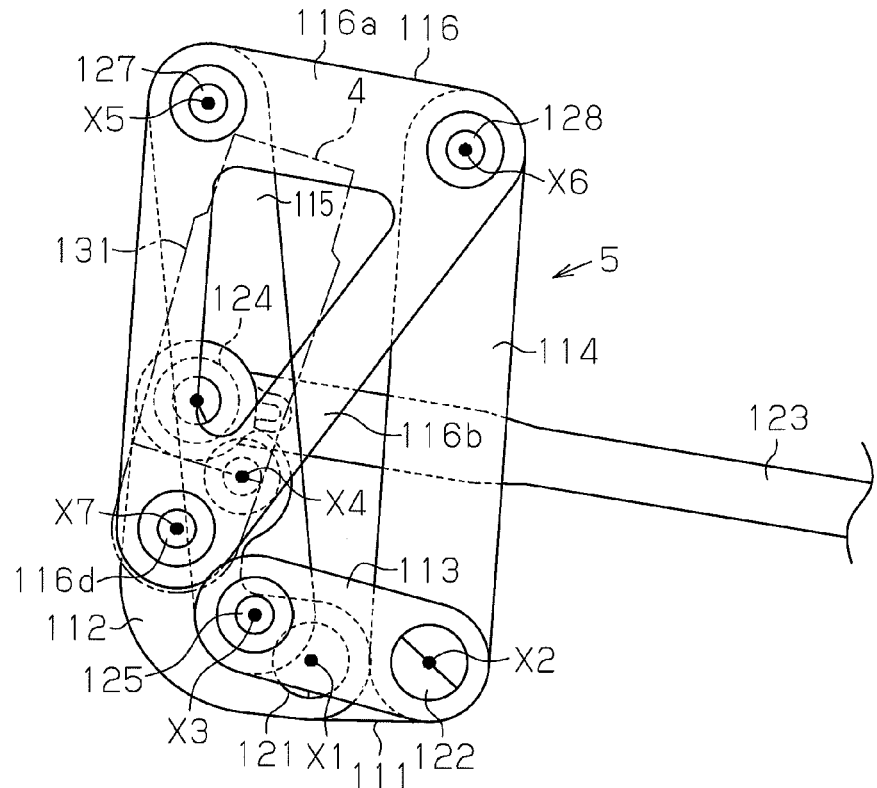
FIG. 20 is a plan view showing the wiper device according to the second embodiment.

As shown in FIGS. 17 and 18, a wiping range enlarging mechanism 5 of the second embodiment includes a vehicle fastening member 111, a drive lever 112, a first coupling member 113, a sub-lever 114, a main lever 115, and a second coupling member 116.

As shown in FIG. 17, the vehicle fastening member 111 includes a drive support 111*a*, a base support 111*b* arranged at a position spaced apart from the drive support 111*a*, and a coupling fastening portion 111*c* that couples the drive support 111*a* and the base support 111*b* and is fixed to the vehicle body. A first shaft 121 is inserted into the drive support 111*a*, and a second shaft 122 is inserted into the base support 111*b* (see FIG. 18). The second shaft 122 is parallel to the first shaft 121.

The drive lever 112 is plate-shaped and formed to have a curved shape when viewed in the thicknesswise direction (axial direction of the first shaft 121). The drive lever 112 has a basal portion fixed to the upper end of the first shaft 121, which is pivotally supported by the drive support 111*a*, so that the drive lever 112 is integrally pivotal with the first shaft 121 about the shaft center X1. A link rod 123 driven by the driving force of the drive source (e.g., wiper motor), which is not shown in the drawings, is coupled to the distal portion of the drive lever 112 by a ball joint 124 (see FIG. 18) and the like, and the drive lever 112 is pivoted back and forth by the driving force of the drive source.

The first coupling member 113 is plate-shaped and formed to be linear when viewed in the thicknesswise direction (axial direction of the second shaft 122). The first coupling member 113 has a basal portion fixed to an upper end of the second shaft 122, which is pivotally supported by the base support 111*b* so that the first coupling member 113 is integrally pivotal with the second shaft 122 about the shaft center X2.

The sub-lever 114 is plate-shaped and formed to be linear when viewed in the thicknesswise direction. The sub-lever 114 has a basal portion supported by the upper end of the second shaft 122 (specifically, immediately below the first coupling member 113) so that the sub-lever 114 is pivotal about the shaft center X2 of the second shaft 122.

The main lever 115 is plate-shaped and formed to be linear when viewed in the thicknesswise direction. The first coupling member 113 has a distal portion including a main coupling portion 125 having a shaft center X3. The main lever 115 has a basal portion coupled to the main coupling portion 125 so that the main lever 115 is pivotal about the shaft center X3. The drive lever 112 has a distal portion (near the ball joint 124) including an intermediate coupling portion 126 having a shaft center X4. The main lever 115 has an intermediate portion coupled to the intermediate coupling portion 126 so that the main lever 115 is pivotal about the shaft center X4.

The second coupling member 116 includes a linear coupling portion 116*a* that is plate-shaped and formed to be linear formed when viewed in the thicknesswise direction. The linear coupling portion 116*a* of the second coupling member 116 is coupled to first and second coupling portions 127 and 128 pivotally about shaft centers X5 and X6 so as to connect the distal portion of the main lever 115 and the distal portion of the sub-lever 114. The second coupling member 116 also includes an extended portion 116*b*, which, when viewed in the thicknesswise direction, has two segments extending from the two ends of the linear coupling portion 116*a* in a direction substantially orthogonal to a line connecting the first coupling portion 127 and the second coupling portion 128 and gradually approaching each other so as to connect at a distal part (extending into a triangular shape with the linear coupling portion 116*a* forming one side of the triangle). A step 116*c* (see FIG. 17) is formed at the intermediate portion of the extended portion 116*b* when viewed from the direction orthogonal to the thicknesswise direction (direction orthogonal to the axis of the second shaft 22). The step 116*c* raises the distal portion of the extended portion 116*b* so that the distal portion of the extended portion 116*b* does not strike the first coupling member 113. An arm support shaft 116*d* projects from the distal portion of the extended portion 116*b* (vertex facing the bottom side of a triangular shape in which the linear coupling portion 116*a* is the bottom side), and the basal portion of the wiper arm 4 is fixed to the distal portion of the arm support shaft 116*d* to integrally move with the coupling member 116. The arm support shaft 116*d* has a shaft center X7 set at a position where the movement path K (see FIG. 22) when driven becomes shorter than the movement path of an arbitrary point on a line connecting the first coupling portion 127 and the second coupling portion 128. In the second embodiment, this position is a stop position and set near the second shaft 122 in the state of the lower reversing position (see FIG. 18).

The wiper arm 4 of the second embodiment is similar to the wiper arm 4 of the first embodiment except in that the basal portion of the arm head 31 is fastened and fixed to the distal portion of the arm support shaft 116*d*.

The arm support shaft 116*d* extends through an opening 41 (see double-dashed line in the partially enlarged view of FIG. 22) formed in the vehicle body (cowl louver etc.), the wiping range enlarging mechanism 5 excluding the distal portion of the arm support shaft 116*d* is arranged inside the vehicle body, and the wiper arm 4 is fixed to and supported by the arm support shaft 116*d* outside the vehicle body (position exposed to the exterior). The opening 41 of the second embodiment is set to be as small as possible and substantially extends along the movement path K (see partially enlarged view of FIG. 22) of the arm support shaft 116*d* (shaft center X7 of the arm support shaft 116*d*).

Figure 21:
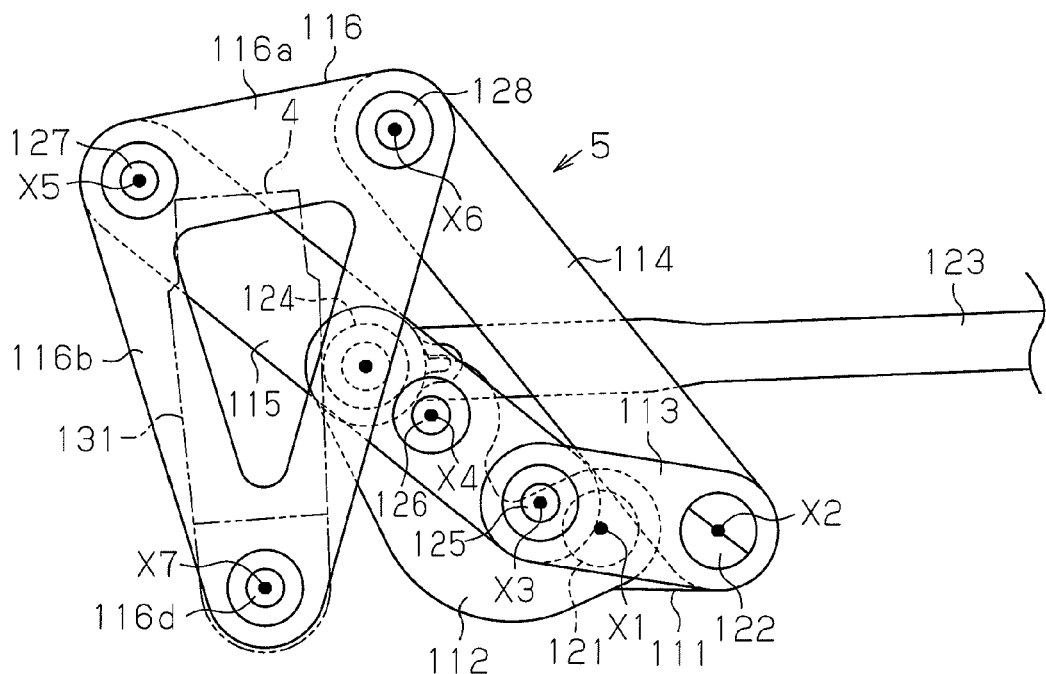
FIG. 21 is a plan view showing the wiper device according to the second embodiment.

As shown in FIGS. 18 to 21, in the vehicle wiper device described above, the driving force of the drive source is transmitted to the drive lever 112 through the link rod 123, and the main lever 115 is driven as the drive lever 112 pivots. In this case, the main lever 115 pivots the first coupling member 113, which is connected to the basal portion (shaft center X3) of the main lever 115, about the shaft center X2 with respect to the vehicle body (windshield 1) in the same direction as the main lever 115. At the same time, the main lever 115 pivots the distal portion about the basal portion (shaft center X3). In this state, the driving of the main lever 115 pivots the sub-lever 114 and changes the position (angle) of the second coupling member 116 and the wiper arm 4 with respect to the main lever 115. In this manner, change in the position (angle) of the wiper blade 3, which is coupled to the wiper arm 4 at a constant position, also changes the position of the wiper arm 4. FIG. 18 shows a state in which the wiper blade 3 is at the first reversing position T1 near the lower end of the windshield 1, FIGS. 19 and 20 sequentially show states in which the wiper blade 3 is moving towards the second reversing position T2 near the pillar 2, and FIG. 21 shows a state (see FIG. 22) in which the wiper blade 3 is located at the second reversing position T2.

In the second embodiment, like advantage (1) of the first embodiment, the wiping range Z1 (second reversing position T2 of the wiper blade 3) substantially lies along the pillar 2 and reduces the unwiped area.

The basal portion of the main lever 115 (shaft center X3) moves relative to the vehicle body (windshield 1). Thus, the main lever etc. may be shortened and the wiper device may be miniaturized compared to a structure in which the basal portion of the main lever is supported with respect to a single point of the vehicle body. This reduces the mounting space of the wiper device.

The shaft center X7 of the arm support shaft 116*d* is set at a position in which the movement path K (see FIG. 22) when driven becomes shorter than the movement path of an arbitrary point on a line connecting the first coupling portion 127 and the second coupling portion 128. The opening 41 formed in the vehicle body (cowl louver etc.) may thus be reduced in size compared to when the arm support shaft is arranged on a line connecting the first coupling portion 27 and the second coupling portion 28.

Figure 22:
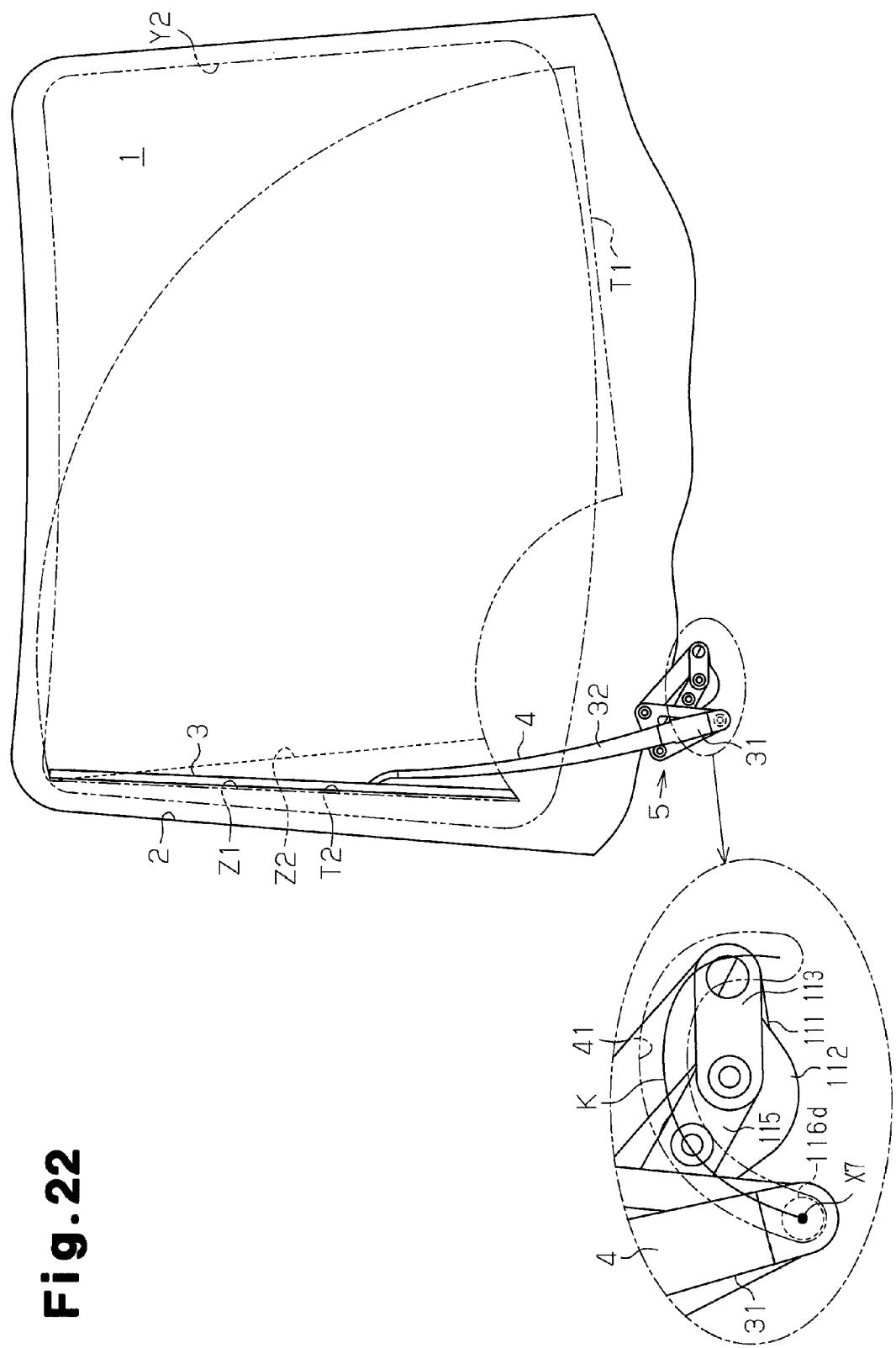
FIG. 22 is a schematic view showing a vehicle equipped with the wiper device according to the second embodiment.

As shown in FIG. 22, the wiping range enlarging mechanism 5 is arranged outside the field of view range Y2 in the wiping surface. The arm support shaft 116*d* extends through the opening 41 formed in the vehicle body, the wiping range enlarging mechanism 5 excluding the distal portion of the arm support shaft 116*d* is arranged inside the vehicle body, and the wiper arm 4 is fixed to and supported by the arm support shaft 116*d* outside the vehicle body. Thus, advantage (6) of the first embodiment may be obtained.

The second embodiment may be modified as described below.

Figure 23:
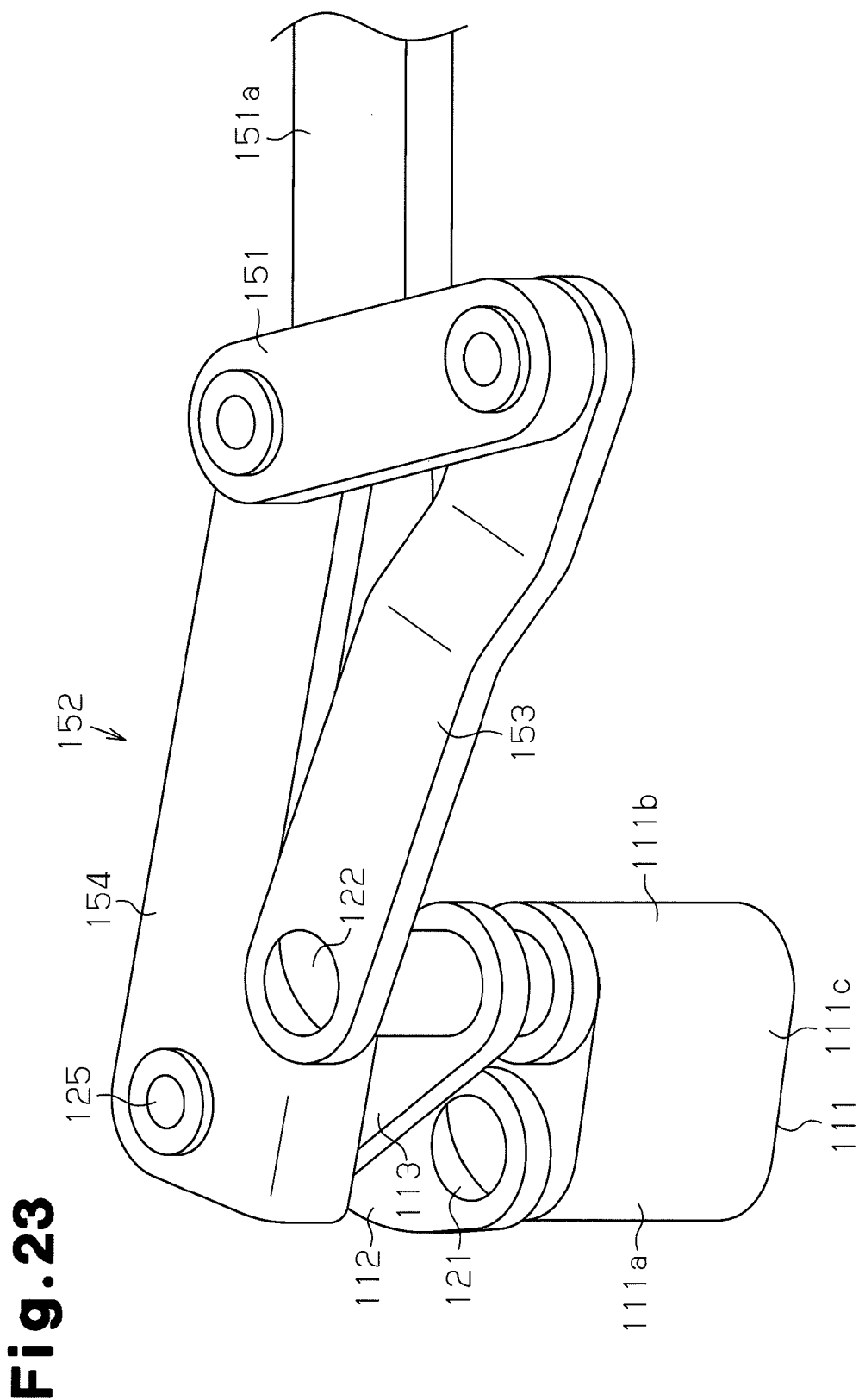
FIG. 23 is a perspective view showing a modification of the wiper device according to the second embodiment.
Figure 24:
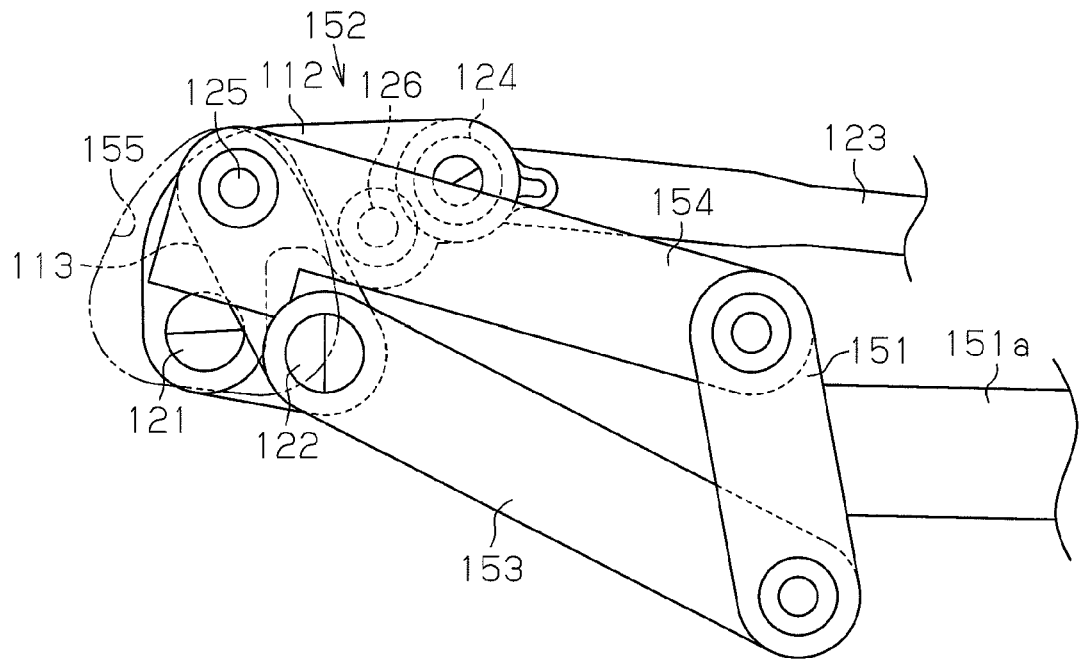
FIG. 24 is a plan view showing a modification of the wiper device according to the second embodiment.
Figure 25:
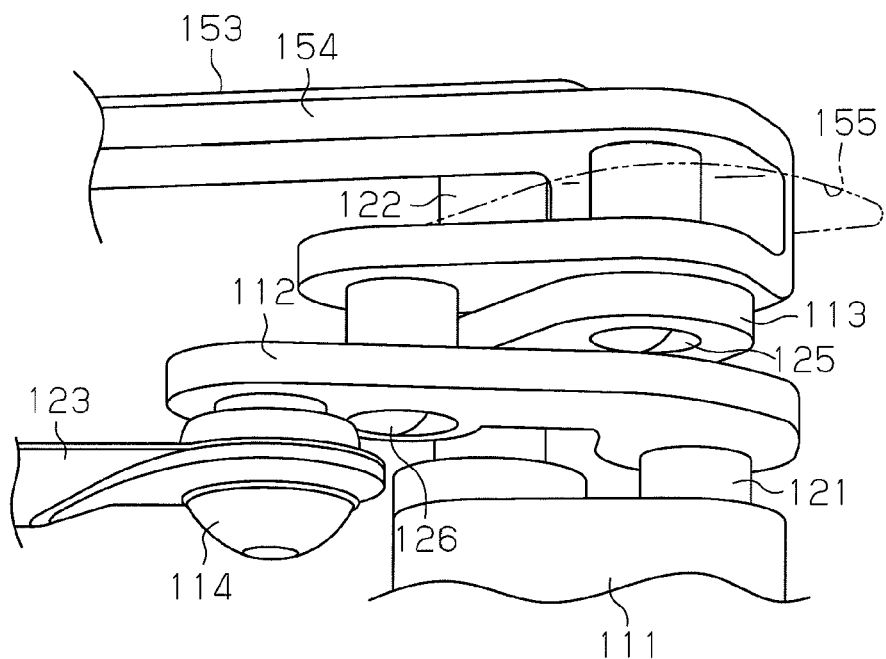
FIG. 25 is a perspective view showing a modification of the wiper device according to the second embodiment.

The position for the shaft center X7 of the arm support shaft 116*d* in the second embodiment may be changed. For example, the position of the shaft center X7 may be changed as shown in FIGS. 23 to 25. In other words, as shown in FIGS. 23 and 24, the second coupling member 116 of the second embodiment may be changed to a second coupling member 151, which does not include the extended portion 116*b* of the second embodiment, and the arm head 151*a* may be formed integrally with (or fixed to) the second coupling member 151. In this wiping range enlarging mechanism 5, the number of components and the number of assembly steps are less than the second embodiment. In a wiping range enlarging mechanism 152 of this modification (FIGS. 23 to 25), the sub-lever 114 and the main lever 115 of the second embodiment are also changed to a sub-lever 153 and a main lever 154 having slightly different shapes. Specifically, in the wiping range enlarging mechanism 5 of this modification (FIGS. 23 to 25), the shapes and axial positions of the sub-lever 153, the main lever 154, and the like are changed so that the second coupling member 151, the sub-lever 153, and the main lever 154 are exposed to the exterior through an opening 155 (see double-dashed line in FIGS. 24 and 25) formed in the vehicle body (cowl louver etc.). The opening 155 is set to be as small as possible and substantially extends along the movement path of a shaft or the like that extends through the opening 155. As a result, the second coupling member 151, the sub-lever 153, and the main lever 154 are exposed to the exterior of the vehicle body (cowl louver etc.). However, the opening 155 is small. This reduces foreign matter that enters the vehicle body and prevents the wiping range enlarging mechanism 152 from trapping foreign matter therein.

A third embodiment according to the present invention will now be discussed with reference to FIGS. 26 to 30 centering on differences from the first embodiment.

Figure 26:
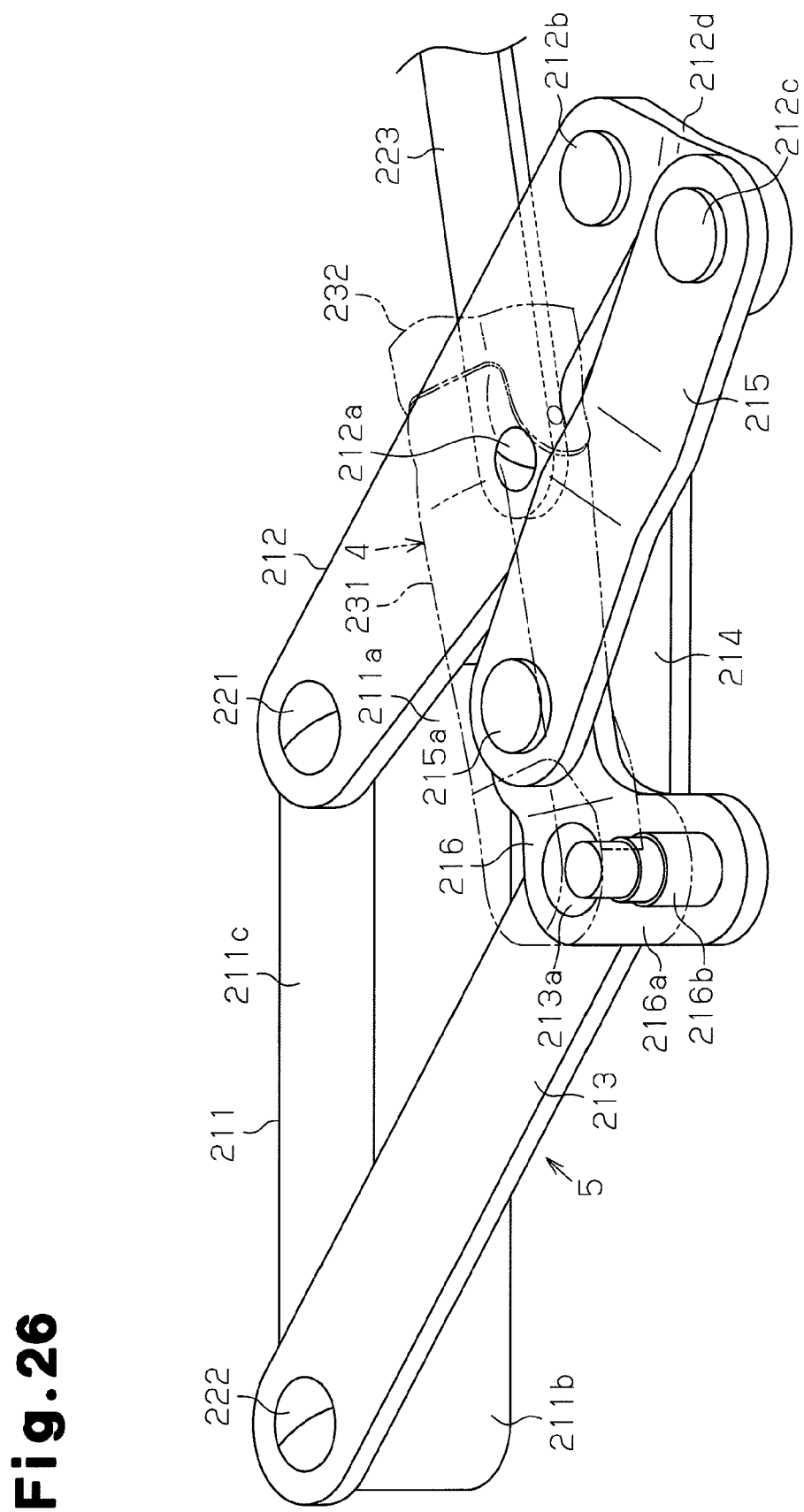
FIG. 26 is a perspective view showing a vehicle wiper device according to a third embodiment of the present invention.
Figure 27:
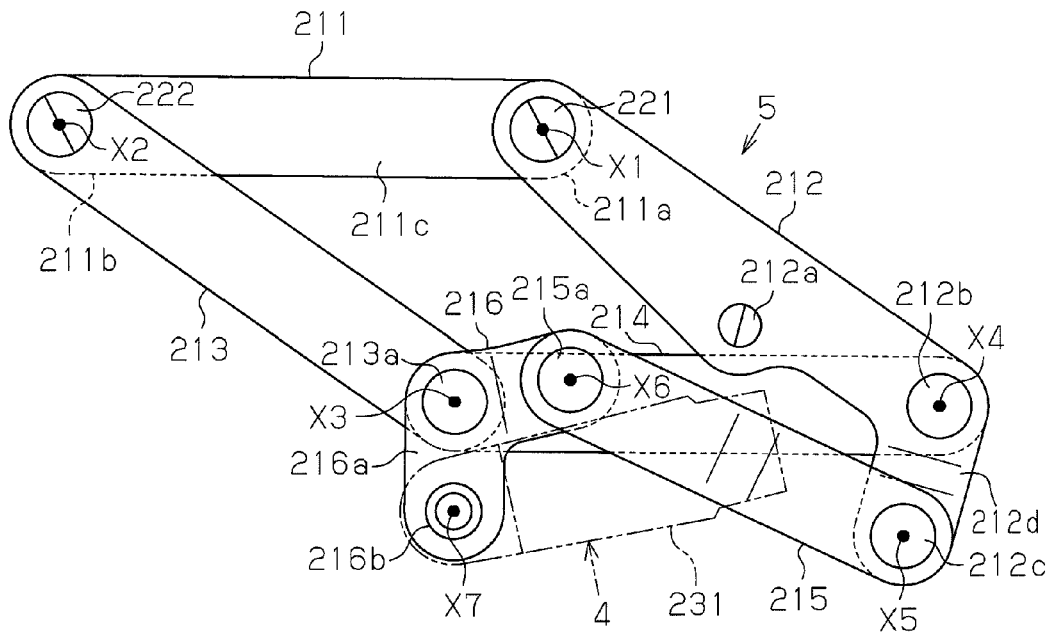
FIG. 27 is a plan view showing the vehicle wiper device according to the third embodiment.

As shown in FIGS. 26 and 27, the wiping range enlarging mechanism 5 of the third embodiment includes a vehicle fastening member 211, a first lever 212, a second lever 213, a slide movement rod 214, a first pivoting member 215, and a second pivoting member 216. In the present embodiment, the vehicle fastening member 211, the first lever 212, the second lever 213, and the slide movement rod 214 configure a slide movement mechanism, and the first pivoting member 215 and the second pivoting member 216 configure an arm pivoting mechanism.

As shown in FIG. 26, the vehicle fastening member 211 includes a first support 211*a*, a second support 211*b* arranged at a position spaced apart in the widthwise direction of the vehicle body from the first support 211a, and a coupling fastening portion 211c that couples the first support 211a and the second support 211b and is fixed to the vehicle body. A first shaft 221 is inserted into the first support 211a, and a second shaft 222 is inserted into the second support 211b. The second shaft 222 is parallel to the first shaft 221.

The first lever 212 is plate-shaped and formed to be linear when viewed in the thicknesswise direction (axial direction of the first shaft 221). The first lever 212 has a basal portion fixed to the upper end of the first shaft 221 and pivotally supported by the first support 211a so that the first lever 212 is pivotal integrally with the first shaft 221 about the shaft center X1. A link rod 223 (see FIG. 26) driven by the driving force of the drive source (e.g., wiper motor), which is not shown in the drawings, is coupled to a link rod coupling portion 212a at the intermediate portion of the first lever 212 by a ball joint (not shown), and the first lever 212 is pivoted back and forth by the driving force of the drive source.

The second lever 213 is plate-shaped and formed to be linear when viewed in the thicknesswise direction (axial direction of the second shaft 222). The second lever 213 has a basal portion fixed to an upper end of the second shaft 222 pivotally supported by the second support 211b so that the second lever 213 is pivotal integrally with the second shaft 222 about the shaft center X2.

The slide movement rod 214 is plate-shaped and formed to be linear when viewed in the thicknesswise direction (axial direction of the first shaft 221). The slide movement rod 214 has two ends pivotally coupled to a first coupling portion 212b at the distal portion of the first lever 212 and a second coupling portion 213a at the distal portion of the second lever 213, respectively. Specifically, the first shaft 221 (shaft center X1 of the first shaft 221), the second shaft 222 (shaft center X2 of the second shaft 222), the second coupling portion 213a (shaft center X3 of the second coupling portion 213a), and the first coupling portion 212b (shaft center X4 of the first coupling portion) are coupled to form a parallelogram by connecting lines in the aforementioned order. In other words, when the first lever 212 is pivoted back and forth by the driving force of the drive source, the slide movement rod 214 is coupled so as to slide and move while remaining parallel to the line connecting the shaft center X1 and the shaft center X2.

The first pivoting member 215 is plate-shaped and formed to be linear when viewed in the thicknesswise direction (axial direction of the first shaft 221). The basal portion of the first pivoting member 215 is pivotally coupled to a pivoting coupling portion 212c at a position spaced apart from the first coupling portion 212b in the first lever 212. Specifically, an extended portion 212d bent and extended from the position of the first coupling portion 212b (shaft center X4) when viewed in the thicknesswise direction (axial direction of the first shaft 221) is formed at the distal portion of the first lever 212, and the basal portion of the first pivoting member 215 is pivotally coupled to the pivoting coupling portion 212c arranged at the distal portion of the extended portion 212d at the shaft center X5. As shown in FIG. 27, the extended portion 212d of the present embodiment is bent at about 45° and extended to the side the second lever 213 is arranged with respect to a line passing through the shaft center X1 and the shaft center X4 when viewed in the thicknesswise direction.

The second pivoting member 216 is plate-shaped and entirely formed to be L-shape when viewed in the thicknesswise direction (axial direction of the second shaft 222). The second pivoting member 216 has a basal portion or intermediate portion pivotally coupled to the second coupling portion 213a of the second lever 213. The second pivoting member 216 has a distal portion (one end of the L-shape) pivotally coupled to a distal coupling portion 215a arranged at the distal portion of the first pivoting member 215 at the shaft center X6. The first pivoting member 215 and the second pivoting member 216 are coupled together with their lengths or the like being set so that the shaft center X6 is always arranged at a position closer to the vehicle fastening member 211 with respect to a line extending through the shaft center X3 and the shaft center X5 within a range in which the first lever 212 is pivoted back and forth by the driving force of the drive source. A support extended portion 216a bent and extended from the position (towards the other end side of the L-shape) of the second coupling portion 213a (shaft center X3) when viewed in the thicknesswise direction is formed at the basal portion (intermediate portion of the L-shape) of the second pivoting member 216. An arm support shaft 216b projects from a distal portion of the support extended portion 216a. The basal portion of the wiper arm 4 is fixed to the distal portion of the arm support shaft 216b so as to move integrally with the second pivoting member 216. As shown in FIG. 27, the support extended portion 216a of the third embodiment is bent at about 80° and extended towards the side in which the pivoting coupling portion 212c (shaft center X5) is arranged with respect to the line extending through the shaft center X6 and the shaft center X3 when viewed in the thicknesswise direction.

The wiper arm 4 of the third embodiment has the same structure as the wiper arm 4 of the first embodiment except in that the basal portion of the arm head 31 is fastened and fixed to the distal portion of the arm support shaft 216b.

Figure 28:
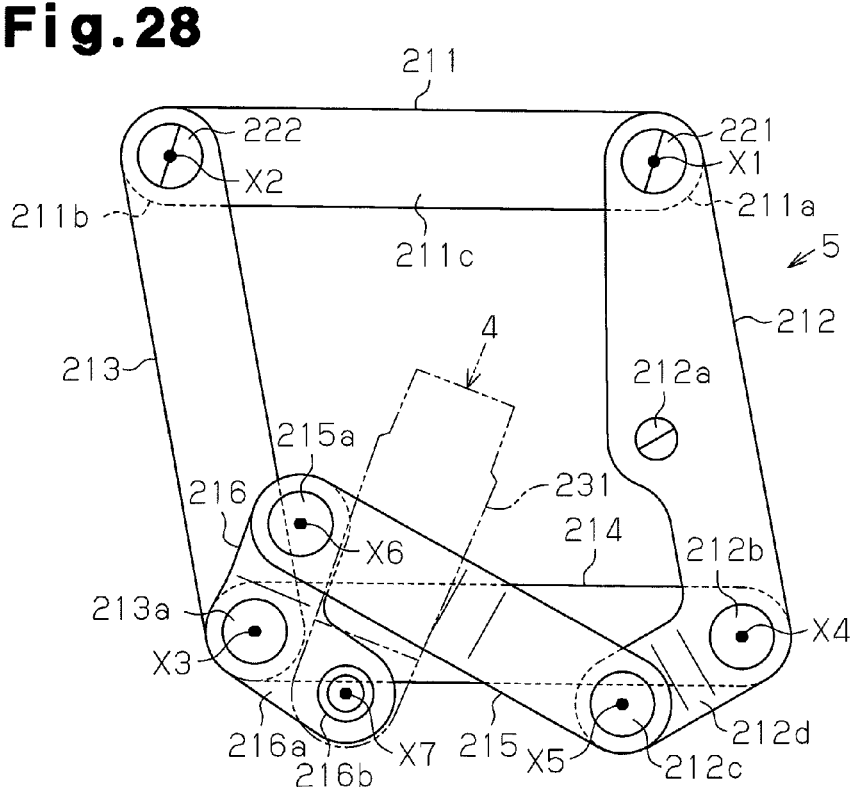
FIG. 28 is a plan view showing the vehicle wiper device according to the third embodiment.
Figure 29:
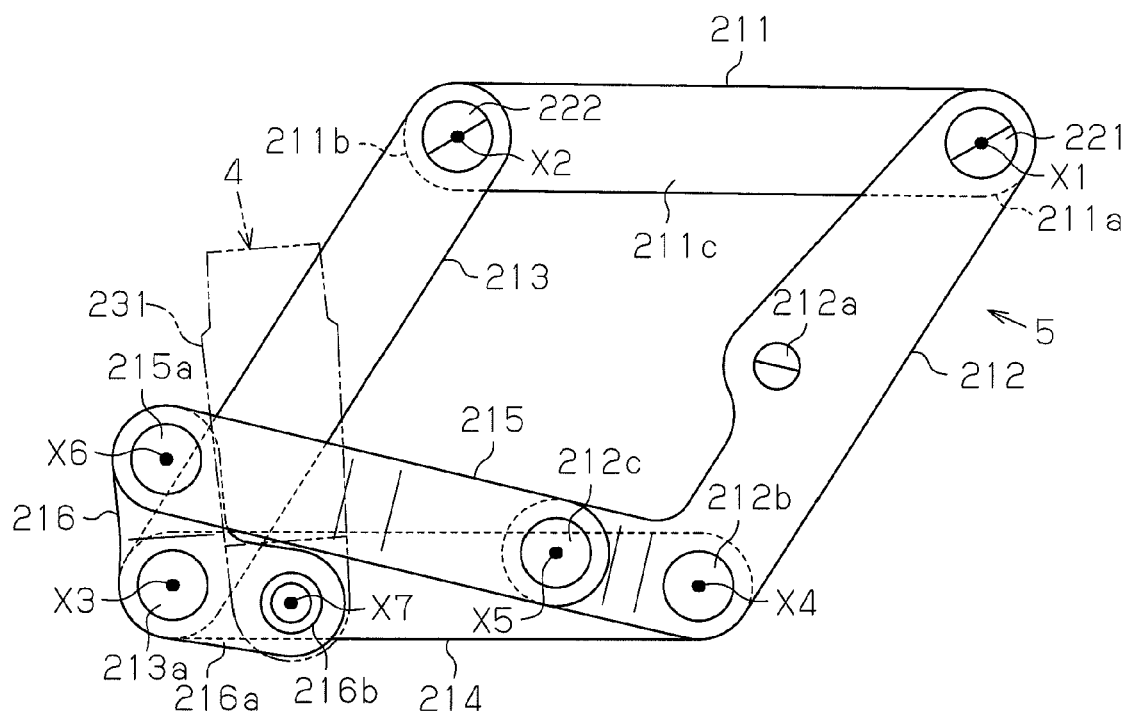
FIG. 29 is a plan view showing the vehicle wiper device according to the third embodiment.

As shown in FIGS. 27 to 29, in the vehicle wiper device described above, due to the slide movement mechanism, the slide movement rod 214 slides and moves while remaining parallel to a line connecting the shaft center X1 and the shaft center X2 when the driving force of the drive source transmitted to the first lever 212 by the link rod 223 pivots the first lever 212 back and forth. The first pivoting member 215 and the second pivoting member 216 are pivoted relative to the slide movement rod 214 by the arm pivoting mechanism that moves in cooperation with the slide movement mechanism. The wiper arm 4 that moves integrally with the second pivoting member 216 is thus pivotally driven as its basal portion moves. FIG. 27 shows a state in which the wiper blade 3 is at the first reversing position T1 near the lower end of the windshield, FIG. 28 shows a state in which the wiper blade 3 is moving towards the second reversing position T2 near the pillar 2, and FIG. 29 shows a state in which the wiper blade 3 is at the second reversing position T2 (see FIG. 30).

The third embodiment has the characteristic advantages described below.

When the first lever 212 is pivoted back and forth by the driving force of the drive source, the slide movement rod 214 slides and moves while remaining parallel to a line connecting the shaft center X1 and the shaft center X2, and the first pivoting member 215 and the second pivoting member 216 pivot relative to the slide movement rod 214. Thus, the wiper arm 4 that moves integrally with the second pivoting member 216 is pivotally driven as the basal portion moves. Therefore, the wiping range Z1 (second reversing position T2 of the wiper blade 3) substantially extends along the pillar 2 and reduces the unwiped area without the need for a structure that changes the position of the wiper blade 3 relative to the wiper arm 4, that is, without requiring a sub-arm arranged along the wiper arm 4 that adversely affects the aesthetic appearance and lowers the driver's field of view.

Furthermore, due to unique wiping range requirements or the like for each vehicle, for example, when changing the movement amount of the basal portion of the wiper arm 4, the movement amount is changed just by changing the coupling position of the link rod 223 to the first lever 212, that is, the position of the link rod coupling portion 212a. When changing the pivot angle amount of the wiper arm 4, the pivot angle is changed just by changing the length of at least one of the first pivoting member 215 and the second pivoting member 216. This easily satisfies the unique wiping range requirements for each vehicle with a simple setting change.

In the same manner as one of the modifications of the first embodiment (see FIGS. 7 and 11 to 16B), the first and second coupling portions 212b and 213a are always arranged on the opposite side of the windshield 1 along the surface of the windshield 1 with respect to the vehicle fastening member 211. Thus, the vehicle fastening member 11 may be arranged farther in a direction opposite to the lower side.

As shown in FIG. 30, the wiping range enlarging mechanism 5 is arranged outside the field of view range Y2 in the wiping surface. The arm support shaft 216b extends through the opening 41 formed in the vehicle body, the wiping range enlarging mechanism 5 excluding the distal portion of the arm support shaft 216b is arranged inside the vehicle body, and the wiper arm 4 is fixed to and supported by the arm support shaft 216b outside the vehicle body. Thus, advantage (6) of the first embodiment is obtained.

The third embodiment may be modified as below.

In the third embodiment, the support extended portion 216a is formed at the second pivoting member 216, the arm support shaft 216b projects from the support extended portion 216a, and the basal portion of the wiper arm 4 (arm head 31) is fixed to the arm support shaft 216b. However, the present invention is not limited in such a manner. For example, the wiper arm 4 (arm head 31) may be formed integrally with the second pivoting member 216. This reduces the number of components and the number of assembly steps in comparison with the third embodiment.

In the third embodiment, the arm pivoting mechanism is formed by the first pivoting member 215 and the second pivoting member 216. However, the structure of the arm pivoting may be changed as long as the arm pivoting mechanism is coupled to the slide movement mechanism and includes the wiper arm 4 and pivots the wiper arm 4 in cooperation with movement of the slide movement mechanism (slide movement rod 14).

In the third embodiment, the basal portion of the second pivoting member 216 is pivotally coupled to the second coupling portion 213a in the second lever 213. However, the present invention is not limited in such a manner. For instance, the second pivoting member 216 may be separately coupled to a position near the second coupling portion 213a in the second lever 213 or a position near the second coupling portion 213a in the slide movement rod 214.

In the third embodiment, in a preferred example, the first and second coupling portions 212b and 213a are constantly arranged on the opposite side of the windshield 1 along the surface of the windshield 1 relative to the vehicle fastening member 211 (first and second supports 211a and 211b). However, the present invention is not limited in such a manner. The positions of the first and second coupling portions 212b and 213a and the vehicle fastening member 211 (first and second supports (212, 213)) may be reversed.

The structure of the wiping range enlarging mechanism in the first to third embodiments may be changed as long as the wiper arm 4 can be driven to obtain the wiping range Z1 shown in FIG. 6. For example, the wiping range enlarging mechanism may be changed to include a plurality of gears.

In the first to third embodiments, the wiper arm 4 includes the arm head 31 and the arm body 32, which is pivotally coupled, that is, in a manner enabling lock back, to the arm head 31. However, the present invention is not limited in such a manner, and a wiper arm that disables lock back may be used instead.

In the first to third embodiments, in preferred examples, the wiping range enlarging mechanism 5 is arranged outside the field of view range Y2 in the wiping surface. However, part or the wiping range enlarging mechanism may be arranged within the field of view range Y2. Further, the arm support shafts 15c (first embodiment), 116d (second embodiment), and 216b (third embodiment) extend through the opening 41 formed in the vehicle body (cowl louver etc.), and the wiping range enlarging mechanism 5 excluding the distal portions of the arm support shafts 15c, 116d, and 216b are arranged inside the vehicle body. However, the present invention is not limited in such a manner, and other portions of the wiping range enlarging mechanism 5 may be arranged outside the vehicle body (position exposed to the exterior).

In the first to the third embodiments, the opening 41 is as small as possible and extends substantially along the movement path K of the arm support shaft 16b. However, the present invention is not limited in such a manner. For example, the opening 41 may be changed to an opening having the shape of a perfect circle or an ellipse that includes the movement path K.

What is claimed is:

1. A vehicle wiper device comprising:
   a wiper arm driven by a driving force of a drive source;
   a wiper blade coupled to a distal portion of the wiper arm at a constant position relative to the wiper arm, the wiper blade being moved back and forth between first and second reversing positions while wiping a wiping surface of a vehicle body when the wiper arm is driven; and
   a wiping range enlarging mechanism that drives the wiper arm while moving a basal portion of the wiper arm towards the second reversing position when the wiper blade wipes the wiping surface from the first reversing position towards the second reversing position so that a wiping angle of the basal portion of the wiper blade at the second reversing position becomes greater than a wiping angle of a distal portion of the wiper blade.

2. The wiper device according to claim 1, wherein the wiping range enlarging mechanism includes:
   a first support arranged integrally with the vehicle body;
   a main lever pivotally supported by the first support and pivoted back and forth by the driving force of the drive source;
   a first coupling portion arranged at a position spaced apart from the first support in the main lever;
   a second support arranged integrally with the vehicle body at a position spaced apart from the first support;
   a sub-lever pivotally supported by the second support;
   a second coupling portion arranged at a position spaced apart from the second support in the sub-lever; and
   a coupling member pivotally coupled to the first and second coupling portions so as to connect the first coupling portion and the second coupling portion; and
   the wiper arm is arranged to move integrally with the coupling member.

3. The wiper device according to claim 2, wherein the first coupling portion is arranged on a side opposite to the wiping surface along the wiping surface relative to the first support.

4. The wiper device according to claim 2, wherein the wiper arm includes:

an arm head having a basal portion coupled to the coupling member or formed integrally with the coupling member; and an arm body having a distal portion, which is coupled to the wiper blade, and a basal portion, which is pivotally coupled to a distal portion of the arm head so as to allow for the wiper blade to be arranged at an upright position in which a longitudinal direction of the wiper blade extends in a direction substantially orthogonal to the wiping surface.

5. The wiper device according to claim 4, wherein the wiping range enlarging mechanism is arranged at a position that is not overlapped with a movement path range of the arm body when viewed from the direction orthogonal to the wiping surface.

6. The wiper device according to claim 2, wherein the wiper arm is supported by an arm support shaft, which projects from the coupling member; and the arm support shaft has a shaft center set at a position at which distance between the shaft center and a shaft center of the first coupling portion is equal to distance between the shaft center of the first coupling portion and a shaft center of the first support and at which becomes aligned with the shaft center of the first support at least once when the wiper arm moves forth or moves back once.

7. The wiper device according to claim 2, wherein the wiper arm includes:

an arm head; and an arm body having a distal portion, which is coupled to the wiper blade, and a basal portion, which is pivotally coupled to a distal portion of the arm head so as to allow for a longitudinal direction of the wiper blade to extend in a direction substantially orthogonal to the wiping surface; and the arm head includes a basal portion formed integrally with the coupling member.

8. The wiper device according to claim 1, wherein the wiping range enlarging mechanism includes:

a drive support arranged integrally with the vehicle body;

a drive lever having a basal portion, which is pivotally supported by the drive support, and a distal portion, which is located opposite to the basal portion, and pivoted back and forth by a driving force of the drive source;

a base support arranged integrally with the vehicle body at a position spaced apart from the drive support;

a first coupling member having a basal portion, which is pivotally supported by the base support, and a distal portion, which is located opposite to the basal portion and includes a main coupling portion;

a sub-lever having a basal portion, which is pivotally supported by the base support, and a distal portion, which is located opposite to the basal portion and includes a second coupling portion;

a main lever having a basal portion, which is pivotally coupled to the main coupling portion, an intermediate portion, which is pivotally coupled to the distal portion of the drive lever, and a distal portion, which is located opposite to the basal portion and includes a first coupling portion; and a second coupling member pivotally coupled to the first and second coupling portions so as to connect the first coupling portion and the second coupling portion; and the wiper arm is arranged to move integrally with the second coupling member.

9. The wiper device according to claim 8, wherein the wiper arm includes:

an arm head having a basal portion coupled to the second coupling member or formed integrally with the second coupling member; and an arm body having a distal portion, which is coupled to the wiper blade, and a basal portion, which is pivotally coupled to a distal portion of the arm head so as to allow for the wiper blade to be arranged at an upright position in which a longitudinal direction of the wiper blade extends in a direction substantially orthogonal to the wiping surface.

10. The wiper device according to claim 8, wherein the wiper arm is supported by an arm support shaft projecting from the second coupling member; and the arm support shaft has a shaft center set at a position at which a movement path of the shaft center when the wiper arm is driven is shorter than a movement path of an arbitrary point on a line connecting the first coupling portion and the second coupling portion.

11. The wiper device according to claim 1, wherein the wiping range enlarging mechanism includes:

a slide movement mechanism including:

a first support arranged integrally with the vehicle body;

a first lever having a basal portion, which is pivotally supported by the first support, a distal portion, which is located opposite to the basal portion and includes a first coupling portion, and a pivoting coupling portion arranged at a position spaced apart from the first coupling portion;

a second support arranged integrally with the vehicle body at a position spaced apart from the first support;

a second lever having a basal portion, which is pivotally supported by the second support, and a distal portion, which is located opposite to the basal portion and includes a second coupling portion; and a slide movement rod pivotally coupled to the first coupling portion and the second coupling portion, the slide movement mechanism slidably moving the slide movement rod while keeping the slide movement rod parallel to a line connecting the first support and the second support when the driving force of the drive source pivots the first lever and the second lever back and forth; and an arm pivoting mechanism, coupled to the slide movement mechanism to pivot the wiper arm in cooperation with movement of the slide movement mechanism.

12. The wiper device according to claim 11, wherein the arm pivoting mechanism includes:

a first pivoting member having a basal portion, which is pivotally coupled to the pivoting coupling portion, and a distal portion, which is located opposite to the basal portion; and a second pivoting member including a basal portion, which is pivotally coupled to the second coupling portion, a position near the second coupling portion in the second lever, or a position near the second coupling portion in the slide movement rod, and a distal portion, which is pivotally coupled to the distal portion of the first pivoting member; and the wiper arm is arranged to move integrally with the first pivoting member or the second pivoting member.

13. The wiper device according to claim 10, wherein the wiper arm includes:

an arm head coupled to or formed integrally with the arm pivoting mechanism; and an arm body having a distal portion, which is coupled to the wiper blade, and a basal portion, which is pivotally coupled to the distal portion of the arm head so as to allow for the wiper blade to be arranged at an upright position in which a longitudinal direction of the wiper blade extends in a direction substantially orthogonal to the wiping surface (1).

14. The wiper device according to claim 11, wherein the first and second coupling portions are arranged opposite to the wiping surface along the wiping surface relative to the first and second supports.

15. The wiper device according to clam 11, wherein the wiper arm is supported by an arm support shaft projecting from the arm pivoting mechanism.

16. A vehicle comprising:
the wiper device according to claim 1, wherein the wiping range enlarging mechanism is arranged outside a field of view range of the wiping surface.

17. A vehicle comprising:
the wiper device according to claim 6, wherein the arm support shaft extends through an opening formed in the vehicle body, the wiping range enlarging mechanism excluding the arm support shaft is arranged inside the vehicle body, and the wiper arm is fixed to and supported by the arm support shaft outside the vehicle body.

18. A vehicle wiper device comprising:
a wiper arm pivoted back and forth about a pivot center by a drive source;
a wiper blade coupled to a distal portion of the wiper arm at a constant position relative to the wiper arm, the wiper blade pivoting back and forth between first and second reversing positions while wiping a wiping surface of a vehicle body as the wiper arm pivots back and forth; and
a wiping range enlarging mechanism that drives the wiper arm while moving a pivot center of the wiper arm towards the second reversing position when the wiper blade wipes the wiping surface from the first reversing position towards the second reversing position so that angular acceleration of the basal portion of the wiper blade is greater than angular acceleration of the distal portion of the wiper blade.

\* \* \* \* \*